United States Patent
Labrecque

(10) Patent No.: US 12,288,271 B1
(45) Date of Patent: Apr. 29, 2025

(54) LIFELOGGING SOFTWARE APPLICATION

(71) Applicant: Rememery Inc., Newbury, MA (US)

(72) Inventor: Cameron Labrecque, Newbury, MA (US)

(73) Assignee: Rememery Inc., Newbury, MA (US)

( * ) Notice: Subject to any disclaimer, the term of this patent is extended or adjusted under 35 U.S.C. 154(b) by 0 days.

(21) Appl. No.: 18/494,433

(22) Filed: Oct. 25, 2023

Related U.S. Application Data

(60) Provisional application No. 63/448,834, filed on Feb. 28, 2023.

(51) Int. Cl.
| | | |
|---|---|---|
| G06Q 50/18 | (2012.01) | |
| G06F 3/0481 | (2022.01) | |
| G06F 3/04845 | (2022.01) | |
| G06T 11/00 | (2006.01) | |
| H04L 9/40 | (2022.01) | |
| G06Q 50/00 | (2012.01) | |

(52) U.S. Cl.
CPC ......... *G06Q 50/186* (2013.01); *G06F 3/0481* (2013.01); *G06F 3/04845* (2013.01); *G06T 11/00* (2013.01); *H04L 63/10* (2013.01); *G06Q 50/01* (2013.01)

(58) Field of Classification Search
CPC .... G06Q 50/186; G06Q 50/01; G06F 3/0481; G06F 3/04845; G06T 11/00; H04L 63/10
See application file for complete search history.

(56) References Cited

U.S. PATENT DOCUMENTS

| | | | |
|---|---|---|---|
| 7,337,172 B2 | 2/2008 | Shapiro | |
| 9,477,737 B1 * | 10/2016 | Charyk | G06F 21/604 |
| 9,742,753 B2 * | 8/2017 | Talley | H04L 67/306 |
| 10,371,472 B2 | 8/2019 | Hoberman | |
| 10,489,465 B2 * | 11/2019 | Mawanda | H04L 67/02 |
| 10,623,831 B1 * | 4/2020 | Paul | H04N 21/816 |
| 10,656,797 B1 * | 5/2020 | Alvi | G06F 3/04817 |
| 10,755,036 B1 * | 8/2020 | Sheth | H04W 4/21 |
| 10,891,539 B1 * | 1/2021 | Kearney | G06V 10/776 |
| 2011/0212711 A1 * | 9/2011 | Scott | H04L 67/04 |
| | | | 455/414.2 |
| 2011/0314104 A1 | 12/2011 | Gray | |
| 2012/0072484 A1 * | 3/2012 | Galipeau | G06Q 50/01 |
| | | | 709/203 |
| 2013/0185653 A1 | 7/2013 | Cantu et al. | |
| 2014/0337059 A1 * | 11/2014 | Simon | G06Q 50/01 |
| | | | 705/4 |
| 2015/0020170 A1 * | 1/2015 | Talley | H04L 63/08 |
| | | | 726/4 |

(Continued)

*Primary Examiner* — Dhairya A Patel
(74) *Attorney, Agent, or Firm* — NEO IP

(57) ABSTRACT

The present invention relates to a lifelogging software application that creates a platform for users to create media content associated with and representative of stories, people, place, events, and other significant moments of an individual's life. The platform creates an environment for individual users to interact with each of and the media content posted thereto. The platform includes a beneficiary and inheritance mechanism that transfers control of media content from one individual to another. The present invention is operable to create a multitude of interactive visual representations of media content, such that the chronological order and location of events are portrayed.

14 Claims, 14 Drawing Sheets

(56) References Cited

U.S. PATENT DOCUMENTS

| | | | | |
|---|---|---|---|---|
| 2015/0081495 A1* | 3/2015 | Randall | ............... | G06Q 40/02 |
| | | | | 705/35 |
| 2015/0123998 A1* | 5/2015 | Chung Davidson | ... | G06Q 50/01 |
| | | | | 345/636 |
| 2015/0242814 A1* | 8/2015 | Saad | ................. | G06Q 50/01 |
| | | | | 705/312 |
| 2015/0324099 A1* | 11/2015 | Tang | ................. | G06Q 10/00 |
| | | | | 715/716 |
| 2015/0365824 A1* | 12/2015 | Gustafson | ............ | H04L 9/0844 |
| | | | | 380/263 |
| 2017/0013408 A1* | 1/2017 | Grzywaczewski | ... | H04W 4/029 |
| 2017/0357382 A1* | 12/2017 | Miura | ............... | G06F 3/04842 |
| 2017/0359292 A1* | 12/2017 | Aziz | ................ | G06Q 50/01 |
| 2018/0097762 A1* | 4/2018 | Garcia | ............. | G06Q 30/0207 |
| 2018/0357728 A1* | 12/2018 | Huening | ............. | H04L 67/535 |
| 2019/0147017 A1* | 5/2019 | Tran | ................ | G06F 3/04817 |
| 2019/0156351 A1* | 5/2019 | Akkiraju | ............ | G06Q 30/0269 |
| 2019/0304012 A1* | 10/2019 | Ramirez | ............ | G06Q 50/186 |
| 2020/0257742 A1* | 8/2020 | Chan | ................ | G06F 16/958 |
| 2021/0117488 A1 | 4/2021 | Koritala | | |
| 2021/0344990 A1* | 11/2021 | Del Sordo | ........... | H04N 21/435 |
| 2022/0179665 A1* | 6/2022 | Rathod | ................ | G06F 9/451 |
| 2022/0239987 A1* | 7/2022 | Gauglitz | ............ | H04N 21/2743 |
| 2024/0320954 A1* | 9/2024 | Saraee | ................ | G06V 10/40 |

\* cited by examiner

LIFELOGGING SOFTWARE APPLICATION

CROSS REFERENCES TO RELATED APPLICATIONS

This application is related to and claims priority to and the benefit of U.S. Provisional Application No. 63/448,834, filed Feb. 28, 2023, which is incorporated herein by reference in its entirety.

BACKGROUND OF THE INVENTION

1. Field of the Invention

The present invention relates to a lifelogging software application, and more specifically to a method and system for encapsulating memories of past events, people, stories, and significant moments.

2. Description of the Prior Art

It is generally known in the prior art to provide a platform for editing audio and video and to provide a platform for an autobiographical application.

Prior art patent documents include the following:

U.S. Patent Pub. No. 2018/0357728 for Management of a media archive representing personal modular memories by inventors Huening, et. al., filed May 24, 2018 and published Dec. 13, 2018, is directed to a management of a media archive representing personal memories. In an embodiment, a graphical user interface, comprising one or more inputs, is generated for a first user. Text, one or more media, and a selection of at least one topic, representing a life milestone, are received from the user via the one or more inputs. A modular content item is generated to comprise the text and one or more media. The modular content item is stored in association with the user and that at least one topic, such that the modular content item may be retrieved based on one and both of the user and the at least one topic. This modular content item may be provided in a graphical user interface of at least one other user.

U.S. Pat. No. 9,742,753 for a Multimedia personal historical information system and method by inventor Talley, filed Jul. 14, 2014 and issued Aug. 22, 2017, is directed to a mobile and web-based personal history capture-store-retrieval process and system intended to be used by individuals or groups (including companies and educational institutions) to record personal historical information in multimedia file format from any source, such as the individual's smartphone, tablet, or personal computer. The system will assist individuals in the recording and storage and retrieval of the individual's (or group's) personal histories. The system employs an artificial intelligence engine to analyze user content (e.g., information, data, metadata, and historical content associated with such user) and design prompts to the user to input additional information. The system also provides a method for creating an e-book from the content, either by a single user or by collaboration among multiple users. Disclosed also is a computer implemented method and system and related computer program product for capturing, storing, retrieving and disseminating personal and/or group legacy and history information.

U.S. Pat. No. 10,489,465 for Digital Scrapbooking by inventor Mawanda, filed Jun. 10, 2016 and issued Nov. 26, 2019, is directed to a data aggregation system and method. A plurality of data source options is retrieved and displayed to a user. The user can select data from a data source, and the data aggregation system suggests additional data. The additional data is retrieved and compiled into a timeline with the data based on date information. A smart storybook engine prompts the user for additional contextual information and incorporates the contextual information into the timeline. The timeline can be output as a storybook or biography.

U.S. Patent Pub. No. 2021/0117488 for Systems of apps using ai bots for one family member to share memories and life experiences with other family members by inventor Koritala, filed Oct. 20, 2019 and published Apr. 22, 2021, is directed to Popopmomom and Kiddoflock apps using AI bots lets the family member to share memories and life experiences with other family members in most easiest and in a more secure way. AI BOT automatically builds the biography once all the questions are answered by the Popopmomom user.

U.S. Pat. No. 7,337,172 for Intergenerational interactive lifetime journaling/diary and advice/guidance system by inventor Shapiro, filed Mar. 25, 2004 and issued Feb. 26, 2008, is directed to an interactive system providing journaling and life coaching. Storage of information, images and the like is provided. Users can request referrals to product and service vendors providing appropriate advice, goods and services as may be desired at specific stages of life. The system can be divided into life phase portions, to assist in keeping of journals or memories at specific phases of life, and to provide information and advice appropriate to experiences one encounters at those particular phases.

U.S. Patent Pub. No. 2013/0185653 for a System and method for providing multimedia compilation generation by inventors Cantu, et. al., filed Jan. 15, 2013 and published Jul. 18, 2013, is directed to generation of compilations. Specifically, to a computer implemented system and method for providing users the ability to generate a multimedia compilation (e.g., biography) and provide the multimedia compilation to one or more individuals in one or more physical and/or digital formats.

U.S. Patent Pub. No. 2014/0337059 for a System and method of incentivizing social media companies to honor the bequeathment requests by inventors Simon, et. al., filed May 7, 2014 and published Nov. 13, 2014, is directed to a system and method of incentivizing social media companies to honor the bequeathment requests of their members. In one embodiment, a central computing interface maintains real-time algorithmic communications, monitoring, updating, and reporting, the digital life insurance network status of user profiles, insureds, extant wills, and the calculated product of the interplay among these entities, such product initiating ownership transfers, payments, and liability limits upon maturation.

U.S. Patent Pub. No. 2011/0314104 for a System and method for selective automatic electronic access of personal data by inventor Gray, filed Jun. 17, 2011 and published Dec. 22, 2011, is directed to a system and method for selective automatic electronic access to personal data. A content distribution system server having a relational database and user navigation facility is accessible via the Internet. Users create memberships and designate recipients, method of delivery, recipient-specific content, and triggering events, and upload this information to the content distribution system server.

U.S. Pat. No. 10,371,472 for a System and method for event triggered information distribution by inventor Hoberman, filed Aug. 16, 2013 and issued Aug. 6, 2019, is directed to a system and computer-based method for automatically distributing information upon the occurrence of predefined events. In a preferred embodiment, the system includes a tool that provides an intuitive interface that allows users to easily create content to be stored and delivered. In a preferred embodiment, the system provides an effective information delivery system that leverages social networking.

SUMMARY OF THE INVENTION

The present invention relates to a lifelogging software application.

It is an object of this invention to provide a platform for users to create content comprised of media to represent past events, people, and stories and ensure they are remembered indefinitely.

In one embodiment, the present invention includes digital media compiling and sharing system including a platform including a processor and a memory in network communication with at least one electronic device; wherein the platform is operable to receive a plurality of media content associated with a prompt; wherein the prompt includes at least one question to stimulate a telling of a story and/or a recollection of a memory; wherein the platform is operable to stitch and/or splice the plurality of media content in a chronological order; and wherein the platform is operable to publish the ordered media on a social media feed.

In another embodiment, the present invention includes digital media compiling and sharing system including a platform including a processor and a memory in network communication with at least one display device; wherein the platform is operable to receive a plurality of media content associated with a prompt; wherein the prompt includes at least one question to stimulate a telling of a story and/or a recollection of a memory; wherein the platform is operable to store the plurality of media for a specified time period wherein the platform is operable to associated the stored plurality of media with a user profile; wherein the stored plurality of media is inaccessible until the specified time period occurs; and wherein the stored plurality of media is sent to the user profile upon the occurrence of the specified time period.

In yet another embodiment, the present invention includes a method for digitally compiling and sharing media including a platform including a processor and a memory receiving a plurality of media content associated with a life story from at least one electronic device; the platform chronologically ordering the plurality of media content to represent a narrative of the life story; the platform automatically creating a multimedia presentation from the chronologically ordered plurality of media; and the platform publishing the multimedia presentation on a social media feed. These and other aspects of the present invention will become apparent to those skilled in the art after a reading of the following description of the preferred embodiment when considered with the drawings, as they support the claimed invention.

DETAILED DESCRIPTION

Figure 1:
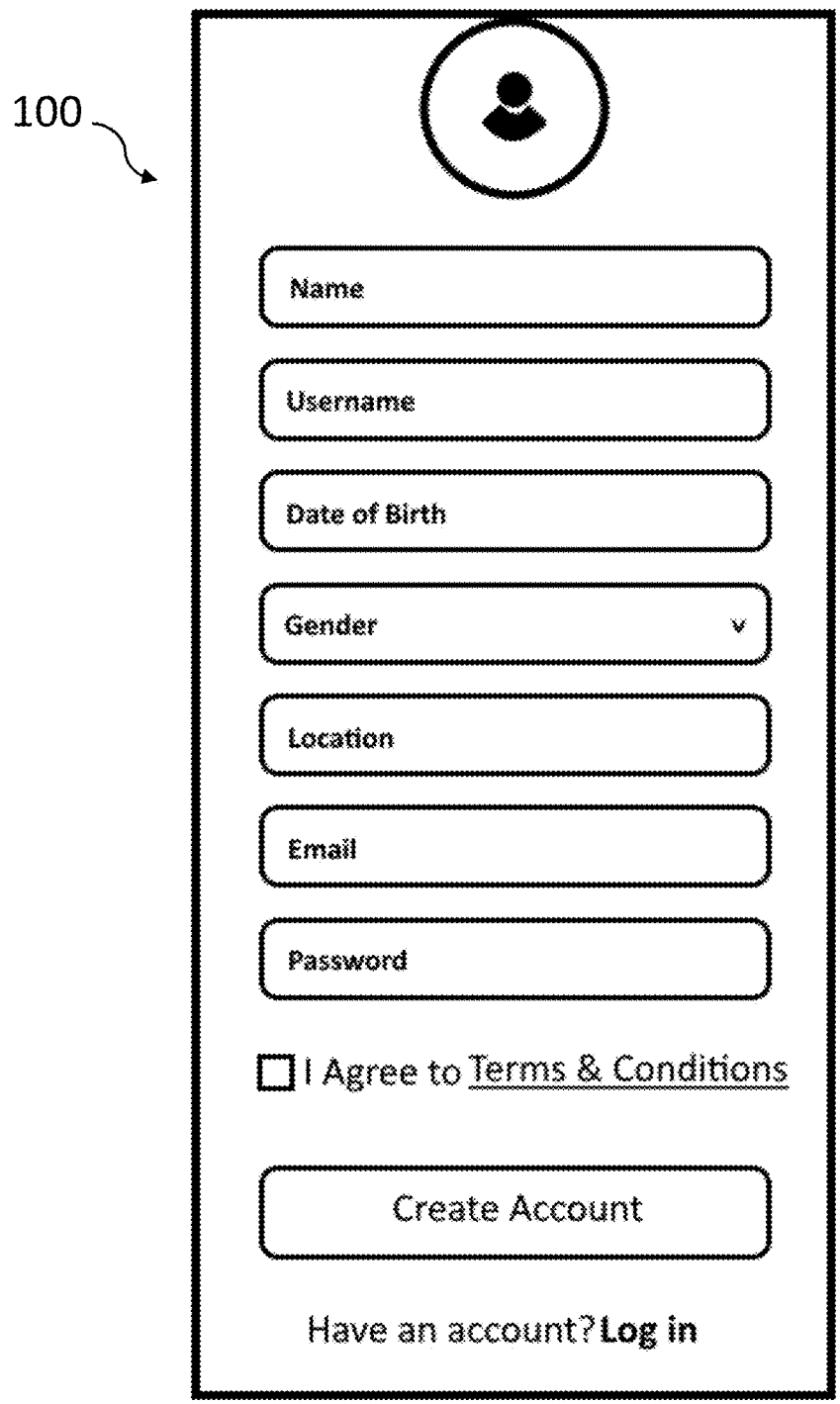
FIG. 1 illustrates a Graphical User Interface (GUI) for a create account menu according to one embodiment of the present invention.

The present invention is generally directed to a lifelogging software application to ensure a user remembers past events, people, and stories indefinitely.

In one embodiment, the present invention includes digital media compiling and sharing system including a platform including a processor and a memory in network communication with at least one electronic device; wherein the platform is operable to receive a plurality of media content associated with a prompt; wherein the prompt includes at least one question to stimulate a telling of a story and/or a recollection of a memory; wherein the platform is operable to stitch and/or splice the plurality of media content in a chronological order; and wherein the platform is operable to publish the ordered media on a social media feed.

In another embodiment, the present invention includes digital media compiling and sharing system including a platform including a processor and a memory in network communication with at least one display device; wherein the platform is operable to receive a plurality of media content associated with a prompt; wherein the prompt includes at least one question to stimulate a telling of a story and/or a recollection of a memory; wherein the platform is operable to store the plurality of media for a specified time period wherein the platform is operable to associated the stored plurality of media with a user profile; wherein the stored plurality of media is inaccessible until the specified time period occurs; and wherein the stored plurality of media is sent to the user profile upon the occurrence of the specified time period.

In yet another embodiment, the present invention includes a method for digitally compiling and sharing media including a platform including a processor and a memory receiving a plurality of media content associated with a life story from at least one electronic device; the platform chronologically ordering the plurality of media content to represent a narrative of the life story; the platform automatically creating a multimedia presentation from the chronologically ordered plurality of media; and the platform publishing the multimedia presentation on a social media feed. These and other aspects of the present invention will become apparent to those skilled in the art after a reading of the following description of the preferred embodiment when considered with the drawings, as they support the claimed invention.

The human mind is fallible and overtime memories fade. This is of great disappointment to individuals who have lost loved ones. Often, memories of our friends and family are the last remaining connection individuals have to their loved ones. Approximately 8 billion people currently live on earth and a vast majority of them will experience the loss of a loved one at some point in their lives. In order to combat this, people have looked to pictures, videos, mementos, and other forms of media to remember their loved ones after they have passed. However, as technology has evolved over the years, media has become fragmented and scattered across a multitude of social media sites, physical locations, mobile devices, scrapbooks, cameras, and hard drives. Overtime scattered media gets lost as well. The consequence of this is devastating and results in family history vanishing forever.

In order to counter this, a method of recording one's life has been developed, called lifelogging. Lifelogging is the process of recording one's daily life, usually through a mobile device, video camera, and even sometimes through a wearable camera. However, this process is usually done independently without a common organizational structure or digital medium.

While certain media organizational methods currently exist on a variety of social media platforms, these methods are lacking in many ways. Current social media platforms are not designed to organize an individual's entire life story, nor do they provide a mechanism to memorialize memories indefinitely. Additionally, current social media platforms lack a mechanism to prompt users to recite their story in relation to a piece of media.

Therefore, there exists a need for a method and system for encapsulating and memorializing memories of past events, people, stories, and significant life moments. The application of the present invention facilitates a method to ensure that memories of past events and loved ones are never forgotten.

The application of the present invention solves the shortcomings of the prior art by providing a variety of features to ensure memories are never forgotten. The application of the present invention provides a platform to record audio, video, and import other types of media content to represent their memories and experiences. The application further provides a means to edit, clip, stitch, and overlay content to better represent the memories and experiences while providing a pleasurable viewing experience. Additionally, the application is operable to automatically organize and compile media in a chronological order to tell a story of one's life. Moreover, the application is operable to provide thought provoking and memory invoking prompts to aid the storytelling process. Furthermore, the application of the present invention implements an inheritance system to ensure media is not lost upon the death of an individual.

In one embodiment, the application of the present invention provides a social platform for individuals to interact and share content together. In one embodiment, the application is operable to store user credentials, maintain user profiles, display social feeds, share content and media to other users on the platform, facilitate instant messages, like, favorite, subscribe, follow, and/or provide other functions known in the art.

In one embodiment, the application of the present invention includes a storytelling feature that is operable to create a storytelling post. In one embodiment, the storytelling feature is operable to ensure current and past memorable moments are captured and stored. In one embodiment, the storytelling feature provides uses with prompts to stimulate memories, so that they are recounted and recorded onto a user device running the application of the present invention. In one embodiment, the storytelling feature is operable to record, save, and share audio recordings, video records, and photographs while providing prompts to stimulate storytelling.

In one embodiment, the application of the present invention includes a narrative of life feature that is operable to make a narrative of life post. In one embodiment, the narrative of life features is operable to automatically create a documentary of a user's life in a chronological, multimedia presentation. In one embodiment, the narrative of life feature is operable to automatically compile a plurality of storytelling postings and/or other videos and images. In one embodiment, the narrative of life feature is operable to provide a user with a platform to manually compile a plurality of storytelling posts. In one embodiment, the narrative of life feature is operable to cut, compile, rearrange, clip, edit, and overlay media from a plurality of storytelling posts.

In one embodiment, the application of the present invention includes a time capsule feature. In one embodiment, the time capsule feature is operable to send and share media with others at a future date. In one embodiment, the time capsule feature is operable to store audio files, video files, photographs, text files, and other media created on the application and send its contents to an individual at a later, schedule time.

In one embodiment, the application of the present invention includes a beneficiary system. In one embodiment, the beneficiary system is operable to assign a beneficiary to a user profile, usually a close family member of the user. In one embodiment, the beneficiary system is operable to grant administrative control and authority over a user profile upon the happening of an event, usually the passing of the user.

In one embodiment, the application includes an inheritance feature. In one embodiment, the inheritance feature is operable to transfer ownership of the content saved to a user profile to another user profile upon the happening of an event, usually the passing of the user.

In one embodiment, the application of the present invention includes a here and now feature. In one embodiment, the here and now feature is operable to automatically compile a plurality of media content associated with a specific event, from one or more different users, to create a single video. In one embodiment, the here and now feature is operable to create a video representative of all the content created at an event or for an event, such that its views are shown a complete picture of the event and left with a single piece of media representative of the event.

In one embodiment, the application of the present invention includes a time slider feature. In one embodiment, the time slider feature is operable to provide an interactive visual experience of a storytelling post, narrative of life post, or other content created on the platform. In one embodiment, the time slider feature is operable to create a chronological visual representation of a storytelling post, narrative of life post, or other content in the form of an elongated temporal bar, such that a user is able to select any moment on a user's post in reference to the timeframe of the entire post. In one embodiment, the time slider is a compressed representation of media files across a user's life (i.e., content associated with a user's early life to content associated with a user's death).

In one embodiment, the application of the present invention includes a location overlay feature. In one embodiment, the location overlay feature is operable to provide a geographical visual experience of a storytelling post, narrative of life post, or other content created on the platform. In one embodiment, the location overlay feature is operable to create a geographical visual representation of a storytelling post, narrative of life post, or other content in the form of objects overlayed onto a map that are associated with the latitudinal and longitudinal coordinates associated with the content. In one embodiment, the location overlay feature is operable to visualize location data associated with content on the platform and allow users to select content to view directly from the map overlay.

In one embodiment, the application is operable on any mobile device known in the art, including but not limited to smart phones, mobile phones, laptop computers, tablets, phablets, etc. The mobile device running the application of the present invention is in network communication with at least one server computer including a processor and a memory. Application data for the mobile application running on the mobile device is preferably stored on one or more databases of the server computer and/or on the mobile device itself. Alternatively, application data is stored on the cloud or on edge nodes.

The application of the present invention is preferably installed on the mobile device. Alternatively, the application is a web-browser based application operable to be accessed through a web browser running on the mobile device.

In one embodiment, the application of the present invention is operable to communicate with a plurality of sensors incorporated in the user device running the application. In one embodiment, the application of the present invention is operable to communicate with one or more of the following: Global Positioning System (GPS) sensor, camera, LiDAR sensor, Quick Response (QR) code scanner, bar code scanner, accelerometer, gyroscope, Ultra-wideband (UWB) transmitter, Radio-frequency Identification Chip (RFID), Near-Field Communication (NFC) chip, and other similar sensors known in the art.

In one embodiment, the server platform uses a system including at least one server computer and at least one user device. The at least one server computer is network-based or cloud-based. The at least one server computer includes at least one process and at least one memory. The at least one user device includes, but is not limited to, a desktop computer, a laptop computer, a smartphone, and/or a tablet. The at least one user device is operable to display a graphical user interface (GUI) for the server platform through a native web page, a downloaded software, and/or a mobile application. The GUI is preferable optimized for display in mobile and/or web formats.

The application of the present invention is operable to create a digital platform for user profiles to share text-based messages, images, audio files, and/or video files (collectively "content"). One skilled in the art will understand that the term content refers to the digital representation of an idea or message and is able to exist in a variety of file formats, file sizes, and/or other variations. One skilled in the art will understand that the term platform refers to an environment associated with a software application, including communication between user devices running the software application and at least one server computer. In one embodiment, the application of the present invention produces a central platform where user profiles are able to share content in a variety of forms through media posts.

Referring now to the drawings in general, the illustrations are for the purpose of describing one or more preferred embodiments of the invention and are not intended to limit the invention thereto.

FIG. 1 illustrates a Graphical User Interface (GUI) for a create account menu 100 according to one embodiment of the present invention. The server platform is operable to receive a request from at least one user device (e.g., a mobile phone, a computer, a tablet, etc.) to create an account and/or a user profile corresponding to one or more users. The server platform includes a plurality of user profiles that are created upon registration with the server platform. Each of the at least one user profile includes account information identifying aspects of the user, user preferences, historical data for the user, and/or other data. Account information includes, but is not limited to, a name (e.g., first name, middle name, last name, nickname, username), a date of birth, a gender, an age, a race, an ethnicity, a physical address, a personal identification number (e.g., social security number (SSN), individual taxpayer identification number (ITIN)), at least one financial account (e.g., bank account number, credit card number, debit card number, digital wallet address, etc.), a job title, at least one email address, at least one phone number, a level of education, one or more alma maters, one or more additional authorized users with access to the account (e.g., a spouse, a child, etc.), and/or other user preferences.

In one embodiment, the application is operable to create a user profile and associate data acquired from use of the application with a user profile. In one embodiment, the application is operable to save user profile data onto one or more server platforms. In one embodiment, the create account menu 100 is operable to receive text input into a plurality of text fields, store the text input, associate the text input with a user profile, and allow access to the platform and data associated with a user profile upon entering of the original text input into the plurality of text fields. In one embodiment, the create account menu 100 includes a name, username, date of birth, gender, location, email, and/or password text field, which are configured to receive text input to serve as identifying credentials for a user profile. In one embodiment, the create account menu 100 includes a create account button. In one embodiment, the create account button is operable to save the information input into the plurality of text fields and associate the text input with a user profile. In one embodiment, the create account button is operable to transition the GUI of the user device running the application to a different GUI page than the account creation menu 100.

Figure 2:
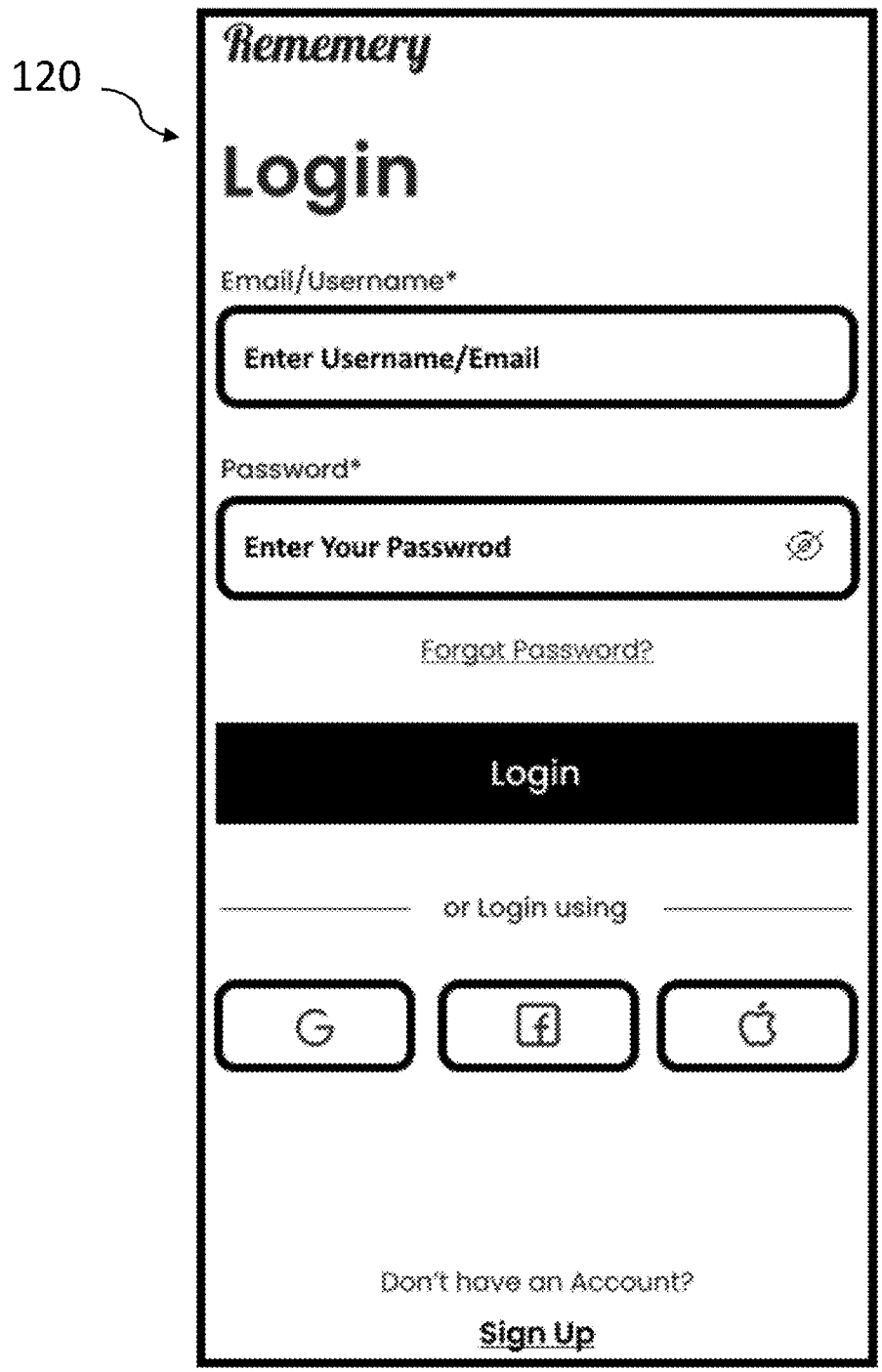
FIG. 2 illustrates a GUI for a login menu according to one embodiment of the present invention.

FIG. 2 illustrates a GUI for a login menu 120 according to one embodiment of the present invention. In one embodiment, the application of the present invention is operable to receive login credentials in the form of text input, cross reference the text input with user data stored on the server computer, and determine that the login credentials match those of a user profile on the server computer. In one embodiment, upon input of matching login credentials, the application grants access to the user profile and grants access to the features of the application. In one embodiment, the application requires a username or email accompanied by a password to grant access to a user profile and access to the features of the application. In one embodiment, the login menu 120 includes a username or email text field and a password text field. In one embodiment, the login menu 120 includes a login button, which is operable, upon selection, to cross check the credentials input into a plurality of text fields with those stored on the server computer, and upon determining a valid match (i.e., the credentials input into the text field are identical to those associated with a user profile) transition the GUI of the user device to a different page than the login menu 120.

In one embodiment, the login menu 120 includes at least one button for logging in via other associated social media accounts (e.g., FACEBOOK, INSTAGRAM, LINKEDIN, GMAIL, YOUTUBE, REDDIT, TWITTER, MYSPACE, TUMBLR, MASTODON, etc.). The server platform receives a selection of one or more social media platforms from a user device and initiates an application programming interface (API) call to verify that the user device being used to login is signed into an account on the selected one or more social media platforms on the user device. If no login using the associated social media account has previously been attempted, then the server platform automatically generates a user profile corresponding to the associated social media account. If an existing user profile exists corresponding to the associated social media account, then the server platform validates login into the existing user profile. This process is useful, as it allows a user to login and access the server platform without having to create a new username and password for the server platform. Furthermore, in one embodiment, the server platform is configured to automatically retrieve data corresponding to the associated social media account via at least API call to a database of the social media platform. In one embodiment, data retrieved via these means include bibliographical data (e.g., name, address, contact information, etc.) and/or preference data (e.g., estimated political views, estimated shopping preferences, estimated content preferences, etc.). In one embodiment, retrieved bibliographical data is used to automatically fill in information corresponding to the generated user profile on the server platform. In one embodiment, retrieved preference data is used to filter and select media displayed for the user profile on the server platform.

One of ordinary skill in the art will understand that one or more of the above-mentioned authentication methods are able to be used in order to log in a user device into a user profile. In one embodiment, the system utilizes multifactor authentication, transmitting an authentication message via one or more communication means (e.g., phone number, email address, one or more linked social media accounts, etc.) including a link to authenticate a login attempt and/or a code to enter in order to complete the login attempt.

Figure 3:
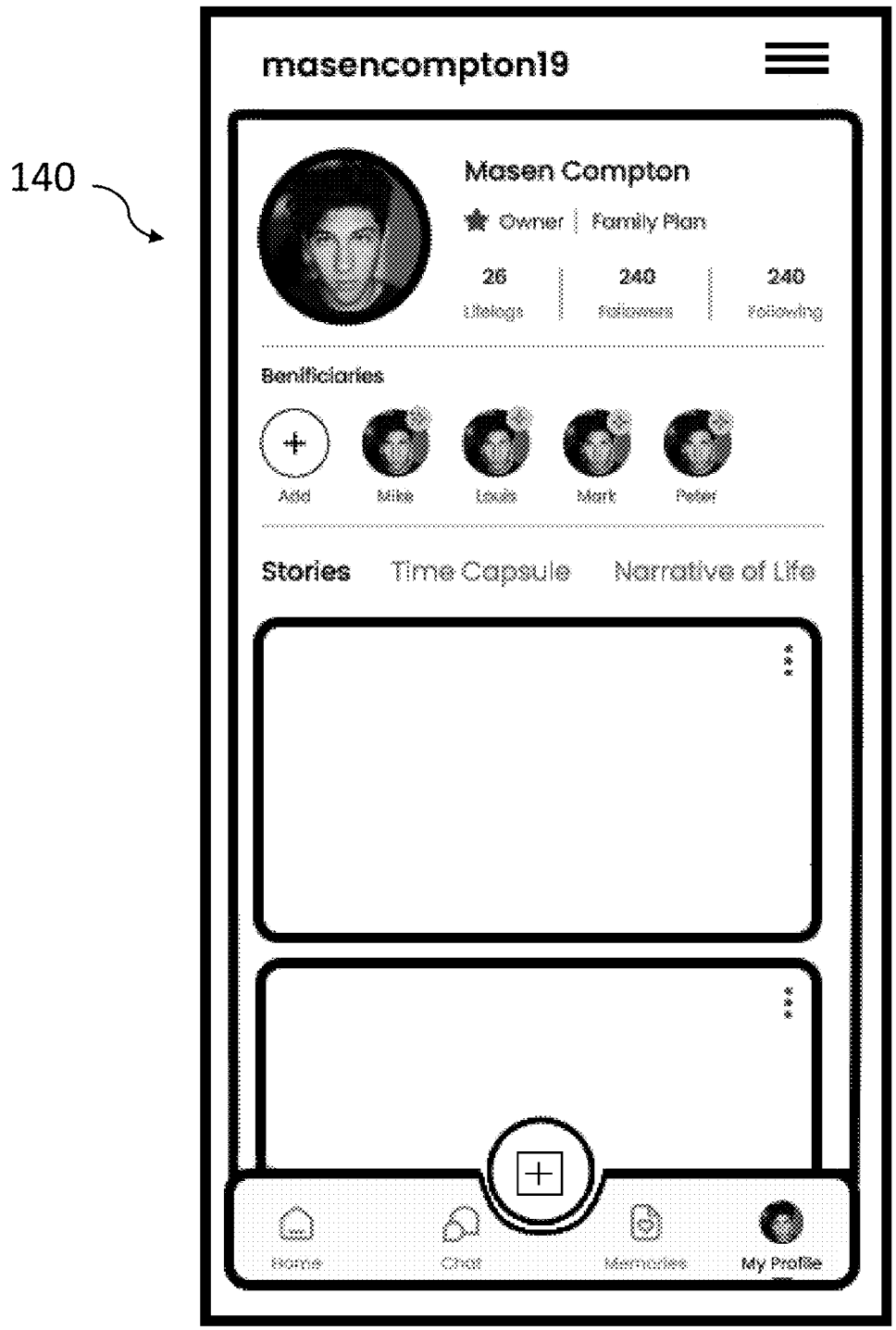
FIG. 3 illustrates a GUI for a user profile page according to one embodiment of the present invention.

FIG. 3 illustrates a GUI for a user profile page 140 according to one embodiment of the present invention. In one embodiment, the user profile page 140 displays information associated with a user profile. In one embodiment, the user profile page 140 includes navigation buttons (displayed at the bottom of FIG. 3) that are operable to transition the GUI of the user device to a different GUI page. In one embodiment, the navigation buttons are included at the bottom of one or more GUI pages of the application. As an example, the GUI of FIG. 3 includes a "My Profile" navigational button that is operable, upon selection, to transition the GUI of the user device to the user profile page 140.

In one embodiment, the user profile page 140 includes a scrolling list or a "feed" of content created by or associated with the user profile. In one embodiment, the user profile page 140 includes organizational content buttons operable, upon selection, to exclusively display content associated with a specific category. As an example, when a user profile selects the stories organization content button (as displayed in FIG. 3) the user profile page 140 will exclusively display content, by the user, associated with story telling posts (discussed later)

In one embodiment, the application of the present invention includes a beneficiary system. In one embodiment the beneficiary system is operable to allow a user profile to select other user profiles as beneficiaries to the media content created on the platform. In this embodiment, the beneficiary system ensures that content and memories are not lost due to the passing of a user of the platform. This is accomplished by providing certain administrative rights to beneficiaries of a user profile. In one embodiment, the beneficiary system is operable to provide a beneficiary user profile with the administrative right to access and take control of another user profile. In one embodiment, the beneficiary system is operable to provide administrative rights to a beneficiary user profile upon the passing of a user corresponding to a user profile. In one embodiment, the beneficiary system is operable to provide a forum for requesting administrative rights through a request with an admin of the application. In one embodiment, the beneficiary system is operable to provide a forum for requesting administrative rights through a request to the owner of a user profile. In one embodiment, the beneficiary system is operable to require a power of attorney in the form of an uploaded document to grant administrative rights. In one embodiment, the beneficiary system is operable to not require a power of attorney in order to perform the operations of the beneficiary system. In one embodiment, the beneficiary system is operable to require alternative forms or proof or documentation to confirm the death of a user associated with a user profile. In one embodiment, the beneficiary system is operable to automatically confirm the death of a user associated with a user profile. In one embodiment, the beneficiary system is operable to require proof of death in the form of an obituary to grant administrative rights. In one embodiment, the power of attorney and/or obituary is submitted to an admin for verification. In one embodiment, the beneficiary system is operable to automatically grant a user profile administrative rights. In this embodiment, the beneficiary system includes an Artificial Intelligence (AI) system that is operable to identify a valid and correctly identifying power of attorney and/or obituary. In one embodiment, upon determination that the power of attorney is valid and represents the user profile, the application grants administrative rights to the requesting user profile. In one embodiment, upon determination that the obituary is valid and represents the user profile, the application grants administrative rights to the requesting user profile. In one embodiment, the beneficiary system is operable to receive a plurality of user profiles as beneficiaries. In one embodiment, the beneficiary system is operable to allow a user profile to tag another user profile as a primary beneficiary, which grants the user profile superior rights over other beneficiaries.

In one embodiment, the beneficiary system does not grant an inheriting user profile administrative rights over another user profile upon the passing of a user. In one embodiment, the platform is operable to memorialize and/or make a copy of the content of the deceased user profile and grant access to the memorialized and/or copied content to the inheriting user profile. In one embodiment, the beneficiary system is operable to create a new user profile based on a deceased user profile and grant access to the new user profile to an inheriting user profile. In one embodiment, the content on a user profile associated with a deceased user is memorialized and is transferred to an inheriting user profile. In one embodiment, the content on a user profile associated with a deceased user is memorialized and includes a different user interface, indicative of a deceased user profile. In one embodiment, an inheriting user profile is granted access to the user interface of the memorialized content.

In one embodiment, the application of the present invention includes an inheritance feature. In one embodiment, the inheritance feature is operable to ensure memories in the form of media content are forever remembered by transferring control and access to the media from one user profile to another. In one embodiment, the application is operable to automatically transfer media content from one user profile to another user profile upon the happening of an event, acceptance of a request, and/or occurrence of a specific date and time. In one embodiment, the application is operable to allow a user profile to specify another user profile or plurality of user profiles as the intended recipient of their media content through the inheritance feature. In one embodiment, the application is operable to allow a user profile to specify a specific date and time to transfer the media content from their user profile to that of another user profile. In one embodiment, the application is operable to allow a user profile to specify a specific occurrence or event as the trigger for the inheritance feature (e.g., the incapacity or death of the user associated with a user profile). In one embodiment, the inheritance feature is operable to provide a forum for requesting inheritance rights through a request with an admin of the platform. In one embodiment, the beneficiary system is operable to provide a forum for requesting inheritance rights through a request to the owner of a user profile.

In one embodiment, the application of the present invention includes a family network system. In one embodiment, the application is operable to allow user profiles to tag other user profiles as within their family network. In one embodiment, a user profile that is tagged as being in the family network of another user profile is provided with preferential treatment in regard to the media content created on the first user profile. In one embodiment, a user profile tagged into a family network is automatically notified of media content created by other user profiles tagged into the same family network. In one embodiment, a user profile tagged into a family network is automatically included in the beneficiary system. In one embodiment, a user profile tagged into a family network is automatically included into the inheritance feature. In one embodiment, a user profile tagged as being in a family network does not include the user profile into the beneficiary system and/or the inheritance feature.

In one embodiment, the server platform receives a selection from a user profile to designate one or more other user profiles as "friends" to associate with the user profile. In one embodiment, only designated friends are able to view certain information regarding a user profile (e.g., one or more designated items of account information), view certain posts made by the user profile, comment on all or some posts made by the user profile, access specific features with respect to the user profile (e.g., send direct messages, initiate a video call and/or audio call, etc.), have their own information visible to the user profile, and/or have one or more of their own posts made visible to the user profile. In one embodiment, the server platform receives a request to designate one or more other user profiles as friends and automatically transmits an invitation to the designated one or more other profiles to accept or deny the friend request.

In one embodiment, the server platform receives a selection from a user profile to subscribe to and/or follow one or more other user profiles. In one embodiment, only subscribers to a particular profile are able to view certain information regarding a user profile (e.g., one or more designated items of account information), view certain posts made by the user profile, comment on all or some posts made by the user profile, access specific features with respect to the user profile (e.g., send direct messages, initiate a video call and/or audio call, etc.), have their own information visible to the user profile, and/or have one or more of their own posts made visible to the user profile. In one embodiment, the server platform receives a request from a primary user profile to subscribe to one or more other user profiles and automatically adds the designated one or more user profiles to a list of subscriber user profile for the primary user profile. In another embodiment, the server platform receives a request from a primary user profile to subscribe to one or more other user profiles and sends a request message to the one or more other user profiles, prompting the one or more other user profiles to confirm the primary user profile subscribing to them. In one embodiment, posts and/or other actions by a user profile to which a primary user profile subscribes appear on a feed interface for the primary user profile, but posts by the primary user profile do not appear on a feed interface for the other user profile.

In one embodiment, a friends list for each user profile is publicly visible. In another embodiment, the friends list for each user profile is hidden or only visible to other user profiles designated as "friends." In one embodiment, each user profile includes preferences regarding whether to set a friends list as private, public, visible only to other friends, visible only to user profiles designated as friends by other friend profiles, and/or visible only to subscribers.

In one embodiment, a subscriber list for each user profile is publicly visible, and shows a list of other user profiles to which the user profile is subscribed or is following. In another embodiment, the subscriber list for each user profile is hidden or only visible to other user profiles designated as "friends" or to users subscribed to the user profile. In one embodiment, each user profile includes preferences regarding whether to set a subscriber list as private, public, visible only to friends, visible only to user profiles designated as friends by other friend profiles, and/or visible only to subscribers.

In one embodiment, a subscribed user profiles list for each user profile is publicly visible, and shows a list of other user profiles subscribed to the user profile. In another embodiment, the subscribed user profiles list for each user profile is hidden or only visible to other user profiles designated as "friends" or to users subscribed to the user profile. In one embodiment, each user profile includes preferences regarding whether to set a subscribed user profiles list as private, public, visible only to friends, visible only to user profiles designated as friends by other friend profiles, and/or visible only to subscribers.

In one embodiment, the server platform provides a list of recommendations of one or more other user profiles to designate as friend profiles. In one embodiment, the list of recommended user profiles is based, at least in part, off how many current friend profiles of a user profile have designated the recommended user profiles as friends. Specifically, user profiles are more likely be recommended if a greater number of current friend profiles of a user profile have designated those profiles as friends. In one embodiment, the list of recommended user profiles is based, at least in part, off shared demographic data and/or preference data between the user profiles and the one or more listed recommended user profiles. In one embodiment, the list of recommended user profiles is based, at least in part, on corresponding contact information stored on a user device associated with the user profile and/or one or more other linked social media profiles. For example, the server platform will automatically recommend user profiles corresponding to a phone number stored in the contact list of a mobile phone associated with the primary user profile. In one embodiment, the server platform recommends user profiles based, at least in part, on matching typical tags associated with content produced by other user profiles with preference data and/or designated categories of interest associated with the user profile.

In one embodiment, the server platform provides a list of recommendations of one or more other user profiles to follow and/or to which to subscribe. In one embodiment, the list of recommended user profiles is based, at least in part, off how many current subscribers or user profiles to which the user profile has subscribed have followed or subscribed to the recommended user profiles. Specifically, user profiles are more likely be recommended if a greater number of current subscribers or user profiles to which the user profile has subscribed have followed or subscribed to those profiles. In one embodiment, the list of recommended user profiles is based, at least in part, off shared demographic data and/or preference data between the user profiles and the one or more listed recommended user profiles. In one embodiment, the list of recommended user profiles is based, at least in part, on corresponding contact information stored on a user device associated with the user profile and/or one or more other linked social media profiles. For example, the server platform will automatically recommend user profiles corresponding to a phone number stored in the contact list of a mobile phone associated with the primary user profile. In one embodiment, the server platform recommends user profiles based, at least in part, on matching typical tags associated with content produced by other user profiles with preference data and/or designated categories of interest associated with the user profile.

In one embodiment, the server platform receives a selection from a user profile to designate one or more other user profiles as blocked and generates a blacklist of other users associated with the user profile. In one embodiment, blocked users are unable to view certain information regarding a user (e.g., one or more designated items of account information), view all or some posts made by the user, comment on all or some posts made the user, access specific features with respect to the user profile (e.g., send direct messages to the user profile, initiate a video call and/or audio call with the user profile, etc.), have their own information viewed by the user, and/or have one or more of their own posts viewed by the user. In one embodiment, each user profile includes preferences regarding what permissions to restrict for blocked profiles, including the ability to view a friends list, the ability to comment on posts, the ability to send direct messages, the ability to initiate video calls and/or audio calls, the ability to view account information, and/or other permissions.

Figure 4:
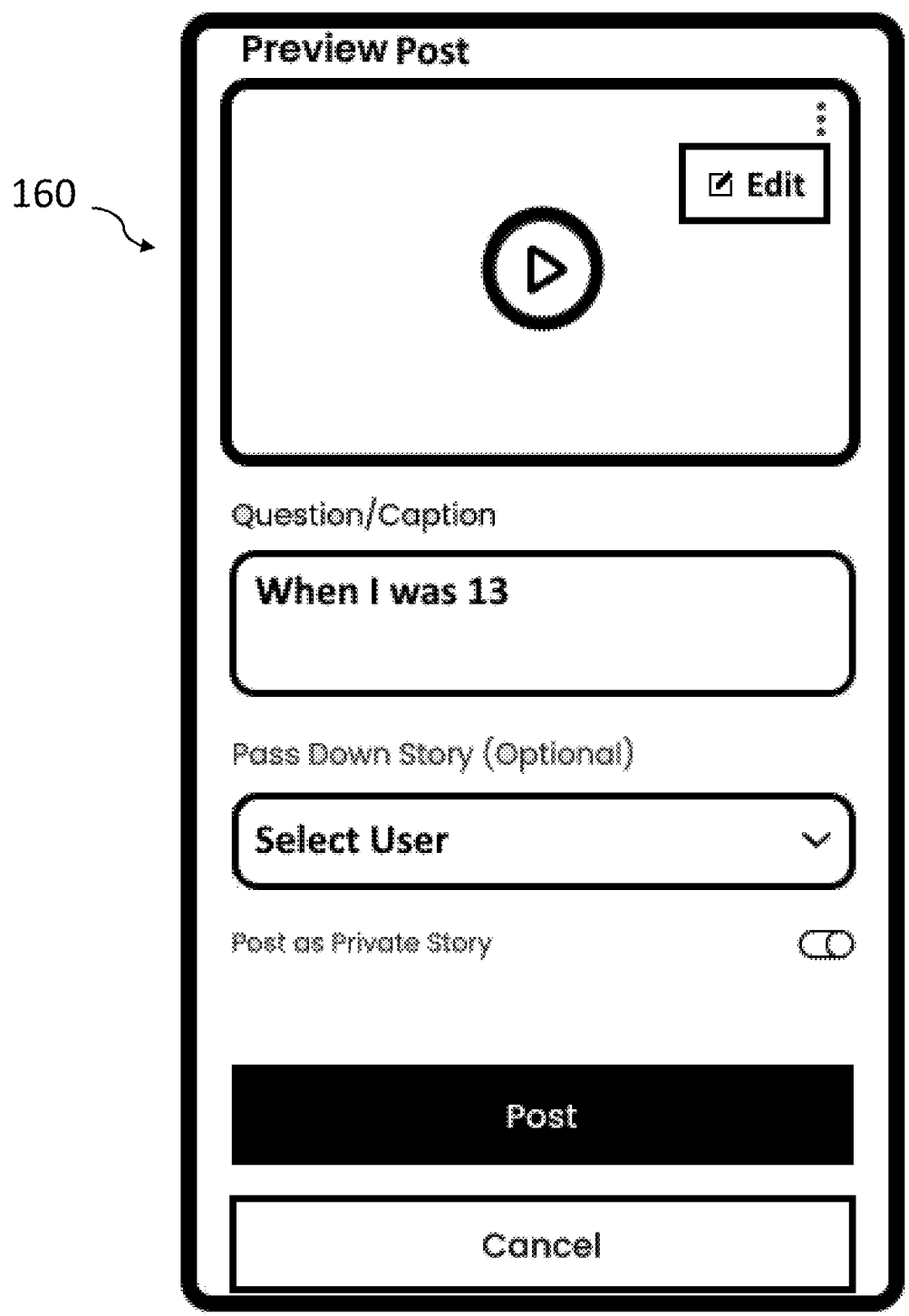
FIG. 4 illustrates a GUI for a post creation menu according to one embodiment of the present invention.

FIG. 4 illustrates a GUI for a post creation menu 160 according to one embodiment of the present invention. The GUI of FIG. 4 is representative of an interface displayed on a user device to enable the creation of a social post to be broadcasted on the platform of the present invention. In one embodiment, the GUI of FIG. 4 includes text fields, upload fields, and selectable options. In one embodiment, the text fields are operable to receive text input. In one embodiment, the upload fields are operable to receive an image, video, audio, and/or multimedia file. In one embodiment, the selectable options are operable to alter aspects of the social post (i.e., make the social post private, categorize the social post, etc.). In one embodiment, the application of the present invention allows users to create social posts and share the contents of the social post with other users on the platform. In one embodiment, the post contains only simple text, an image, a video, a link, and/or other content. In one embodiment, the application of the present invention is operable to allow a user to post an image, status, video, Graphics Interchange Format (GIF), poll, and/or discussion thread. It should be understood that the GUI of FIG. 4 represents the applications capacity to share a wide variety of content with others. The GUI of FIG. 4 is operable to post and share content in any way known in the art. In one embodiment, content posted appears on the social feed (discussed later) of the application for other users to see and interact with.

In the preferred embodiment, the GUI of FIG. 4 displays an interface for creating a post about a past event, person, memory, story, or significant moment. In the preferred embodiment, the post creation menu 160 includes a media input field. In one embodiment, the media input field is operable to receive a multimedia file associated with a memory, story, event, person, or other significant moment of the user's life. In one embodiment, the GUI of FIG. 4 is operable to display a preview of the social post, such that the post is displayed on the GUI of the user device prior to being shared with other users of the platform. In one embodiment, the post creation menu 160 includes an edit button operable, upon selection, to edit, remove, and/or add multimedia to associate with the social post. In the preferred embodiment, the GUI of FIG. 4 includes a question and/or caption text field. In this embodiment, the question and/or caption text field is operable to receive text input to be displayed onto the social post. In the preferred embodiment, the question and/or caption text field displays information related to the media accompanying the social post. In one embodiment, the post creation menu 160 includes a pass down story field. In this embodiment, the pass down story field is operable to select a user to inherit the social post. In one embodiment, the pass down story field is operable to grant a selected user access and control over the social post, immediately or after a predetermined time or event (e.g., death of the user).

Figure 5:
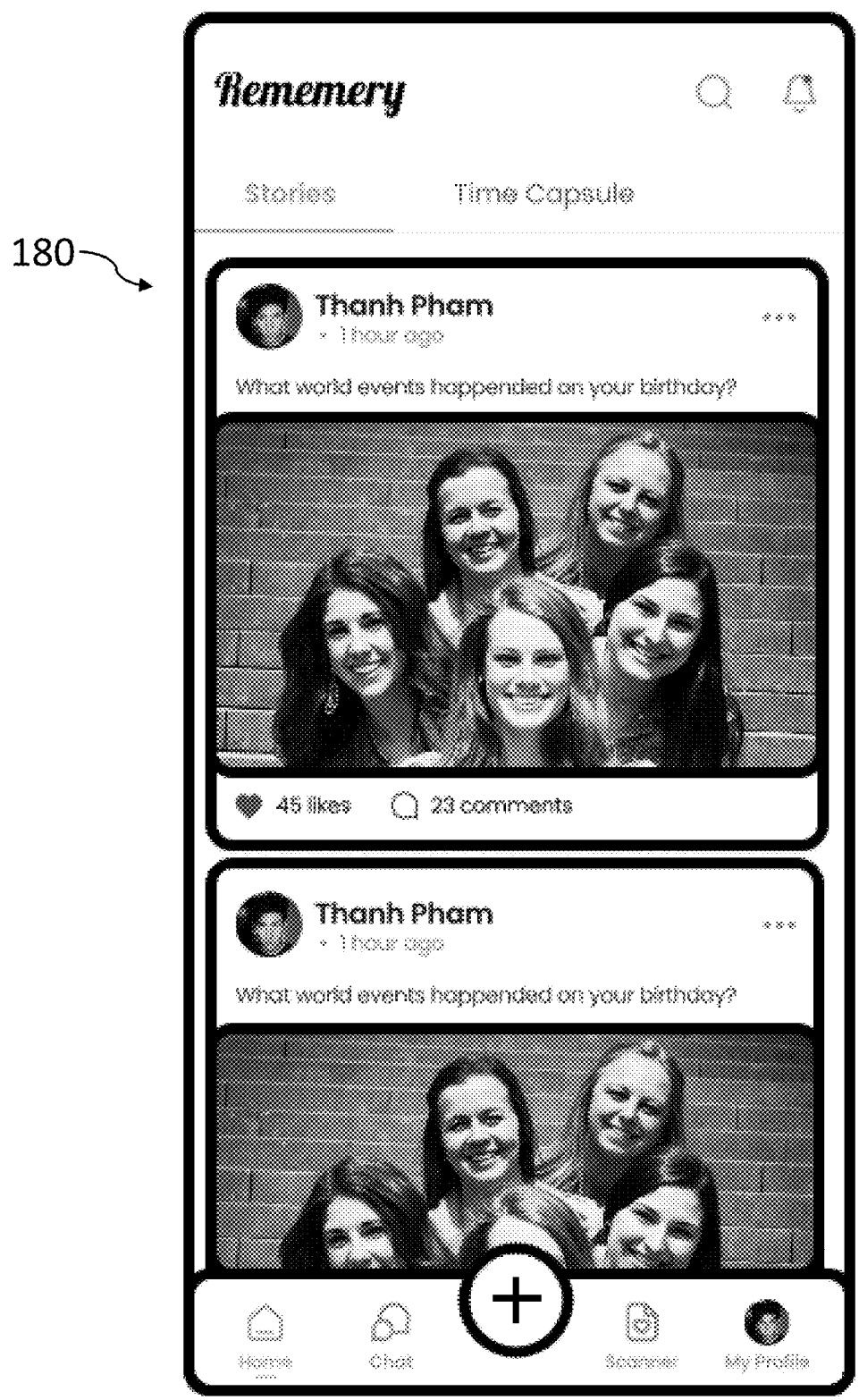
FIG. 5 illustrates a GUI for a social feed according to one embodiment of the present invention.

FIG. 5 illustrates a GUI for a social feed 180 according to one embodiment of the present invention. In one embodiment, the application of the present invention is operable to share or "post" media to a public feed or "social feed." The GUI of FIG. 5 illustrates an exemplary embodiment of a social feed 180. In one embodiment, the social feed is displayed onto the GUI of the user device running the application. In one embodiment, the social feed 180 includes a plurality of social posts from user profiles of the platform. In one embodiment, the plurality of social posts are displayed as a scrolling list in chronological order of when they were created. In one embodiment, the social feed 180 includes storytelling posts, time capsules, and/or narrative of life posts. In one embodiment, the social feed 180 includes social posts from user profiles selected as friends, family, beneficiaries, and/or inheritance user profiles. In one embodiment, the social feed 180 includes social posts from all or a select number of user profiles selected as friends, family, beneficiaries, and/or inheritance user profiles. In one embodiment, the GUI of FIG. 5 includes category tab buttons. In one embodiment the category tab buttons are operable, upon selection, to organize the social posts by category, such that the GUI of the user device exclusively displays social posts within the category selected. As an example, the GUI of FIG. 5 includes a stories category tab that is operable, upon selection, to exclusively display storytelling posts.

In one embodiment, the server platform is able to receive a selection to publicly post one or more text-based messages, images, audio files, and/or video files (i.e., social post). The publicly posted messages are not sent directly to a specific user, but rather publicly visible or visible to a subset of user profiles on the server platform (e.g., friends of the posting user profile, non-blocked user profiles for the posting user profile, etc.). In one embodiment, the social posts are displayed onto the social feed 180 of a plurality of user profiles of the platform. In one embodiment, social posts are stored in at least one database associated with the server platform. In one embodiment, social posts are deleted from the at least one database after a predetermined amount of time (e.g., three days, one week, one month, three months, one year, etc.). In one embodiment, the server platform stores and/or displays metadata regarding each social post, including a date and/or time the post was made, a location from which the post was made, and/or a type of device from which the post was made (e.g., mobile phone, computer, tablet, etc.). In one embodiment, the server platform receives a selection for a new social post to respond directly to one or more posts, and the server platform automatically displays a visual indication of the one or more referenced posts with the newly post.

In one embodiment, new social posts made by a user profile, if the new social posts are not set to private, are automatically added to a user profile page for the user profile, allowing other user profiles to see a history of social posts made by a single user profile. Additionally, in one embodiment, new posts made by a user profile are also added to a social feed 180 for friend profiles, unless the posts are set to private. The social feed 180 interface allows a user profile to see what new things are being done by friends so as to keep up with the lives of other known users. In one embodiment, new posts made by a user profile are publicly searchable through at least one search interface of the server platform.

In one embodiment, when a user profile designated as a friend profile makes a new post and/or if another user profile adds a comment to a post made by a user profile, the server platform automatically transmits a push notification, a text notification, and/or an email notification to one or more user devices signed into the recipient user profile in real time. In one embodiment, the user profile includes preferences regarding receiving notifications when a friend profile makes a post and/or when a comment is left on a user profile's post. By way of example and not limitation, the user profile includes preferences regarding whether notifications are only transmitted when specific friend profiles make a post, what type of notifications are sent (e.g., push, text, email, etc.), and/or whether notifications are sent at all.

In one embodiment, the server platform is operable to receive a selection of a "reaction" and/or a comment to one or more of the posts. In one embodiment, the reaction includes an emoji (e.g., a thumbs up, a thumbs down, a heart, a face, a flag, etc.). In one embodiment, each post includes an emoji hotbar, providing an ability to transmit one or more predetermined, small graphic images (i.e., emojis) in a comment. In one embodiment, the server platform is operable to receive a selection to upload one or more files (e.g., text files, spreadsheet files, image files, audio files, video files, etc.) from the user device to attach to and include with any transmitted comments. In one embodiment, the comment section interface for each post includes a native video player for displaying and playing uploaded videos within the comment section interface.

In one embodiment, the social feed 180 interface for showing a plurality of posts includes an option to share and/or repost each individual post. Selecting to share and/or repost a post causes an interface to be generated, prompting to add additional commentary, links, and/or files to the repost. In one embodiment, selecting to share and/or repost a post initiates a prompt to select one or more other social media platforms and/or other communication means (e.g., email, text, etc.) on which to share the post. Alternatively, the post is able to be reposted on the server platform itself. In one embodiment, reposts include the content of the original, a link to the original post, additional comments made by the reposting user profile, and/or other content.

In one embodiment, the platform is operable to transfer content created or shared on the platform from one user profile to another user profile. In one embodiment, a transfer of content is operable to grant access to the transferred content on one or more user profiles. In one embodiment, transferring content is accessible on one or more user profiles. In one embodiment, the application of the present invention is operable to transfer content created on the platform from a user profile to a newly created user profile. In one embodiment, a user profile that receives transferred content is operable to include the content in a storytelling post, social post and/or a narrative of life post. In one embodiment, the application of the present invention is operable to create storytelling posts, social posts, and/or narrative of life posts using one or more transferred content.

In the preferred embodiment, the social feed 180 includes social posts associated with past stories, memories, events, people, place, and/or other significant moments of a user's life. In the preferred embodiment, by displaying the social feed 180, the GUI of the user device displays a scrolling list of memorable moments of different individual's lives. In the preferred embodiment, the social feed 180 includes storytelling posts, narrative of life posts, and/or time capsule posts associated with user profiles selected as friends, family, beneficiaries, followed, and/or inheritors.

In one embodiment, the application of the present invention is operable to allow user profiles to like, dislike, comment, and/or share social posts created by other users on the platform. In one embodiment, the GUI of FIG. 5 includes selectable buttons to allow a user profile to like, dislike, comment, and/or share social posts created by other users on the platform. In one embodiment, the GUI of the present invention is operable to display the likes, dislikes, comments, and/or shares of a given social post directly on the social post and/or social feed 180. In one embodiment, when a social post receives a like, dislike, comment, and/or share, the application of the present invention automatically sends a push notification, a text notification, and/or an email notification to one or more user devices signed into the recipient user profile in real time. In one embodiment, the user profile includes preferences regarding receiving notifications upon receipt of a chat message. By way of example and not limitation, the user profile includes preferences regarding whether notifications are only transmitted when the chat messages are from designated friend profiles, what type of notifications are sent (e.g., push, text, email, etc.), and/or whether notifications are sent at all.

In one embodiment, the server platform includes a chat interface. Through the chat interface, messages are transmitted directly from one user profile to another user profile. In one embodiment, messages transmitted via the chat interface are not publicly visible. However, in one embodiment, messages transmitted via the chat interface are stored in at least one database associated with the server platform. In one embodiment, messages are deleted from the at least one database after a predetermined amount of time (e.g., three days, one week, one month, three months, one year, etc.). In one embodiment, the server platform stores and/or displays metadata regarding each message, including a date and/or time the message was transmitted or received, a location from which the message was transmitted, and/or a type of device from which the message was transmitted (e.g., mobile phone, computer, tablet, etc.). In one embodiment, the chat interface stores and/or displays a date and/or time in which a user first receives a notification that a message was transmitted and/or a date and/or time in which a user first opens the transmitted message. In one embodiment, the server platform receives a selection for a chat message to respond directly to one or more other messages, and the server platform automatically displays a visual indication of the one or more referenced messages with the transmitted chat message.

In one embodiment, the application of the present invention is operable to provide a platform for users to record stories about their life and share them with other users of the platform in the form of a storytelling post. In one embodiment, the application is operable to functionally communicate with the audio and video recording components of a user device. In one embodiment, the application is operable to provide a platform for users to record video and audio files of themselves telling a story about a person, event, or other significant moment in their life. In one embodiment, the application is operable to overlay a plurality of media over the audio and/or video media files. In this embodiment, overlay refers to including test overtop of the media, such that the underlying media and additional text is viewed simultaneously. Similarly, overlay also refers to including additional audio with the audio of the media, such that the underlying medio and additional audio are played simultaneously. As an example, the application is operable to overlay a plurality of photographs onto an audio recording, such that while the audio recording recounts stories about the user's childhood, the plurality of photographs displays moments of the user's childhood. Similarly, and as another example, the application is operable to overlay music onto a video recording, such that while the video recording recounts moments of a user's life the music provides emotion and feeling to the experience. In one embodiment, the application is operable to post the storytelling post onto the social feed 180. In one embodiment, the application is operable to send a storytelling post directly to another user profile of the platform. In one embodiment, the application is operable to send the storytelling post to the social feed 180 and/or directly to another user profile at a later, predetermined date and time.

In one embodiment, the application is operable to receive and store audio recordings, video records, photographs, Graphics Interchange Format (GIF), and/or text files accompanied by text-to-speech functionality (herein referred to as "media"). In one embodiment, the application is operable to automatically stitch together media in a chronological order of when the media was created. This is accomplished receiving metadata associated with media, as a nonlimiting example, the platform is operable to determine the data and time of media creation by reading a timestamp associated with the media. In one embodiment, the application is operable to automatically stitch together media in a chronological order of the timeline associated with the media (i.e., the application will place a story told about a user's childhood before a story told about a user's adulthood). In one embodiment, this is accomplished by utilizing AI to determine the relative ages of individuals depicted in the media. In one embodiment, the AI is operable to consider metadata of the media and age-determining algorithms to chronologically order the media. In one embodiment, the application is operable to receive manual input regarding the order and/or combination of media, such that a user is able to create their own story by editing and stitching together media in whatever order they desire. For clarity, "stitch" refers to the process of compiling or combining two or more media files seamlessly together, such that they become one coherent media file. As a nonlimiting example, the platform is operable to stitch two video clips together, such that they come a new video file that contains the content of the two video clips.

In one embodiment, the application is operable to overlay music onto media recordings. In one embodiment, the application is operable to crop, splice, stitch, rotate, change the speed of, and otherwise modify or enhance media files. In one embodiment, the application is operable to add visual effects, transitions, and sound effects to media files. In one embodiment, the application is operable to overlay text onto media files. In one embodiment, the platform is operable to automatically splice, stitch, or otherwise modify the media files to be in a chronological order of when the events described in the media occurred. For clarity, splice refers to the process of shortening, tapering, or cutting media, such as a video clip, in order to merge it with another media file, such as an accompanying video clip, in order to create a seamless transition between the two media files.

Figure 6:
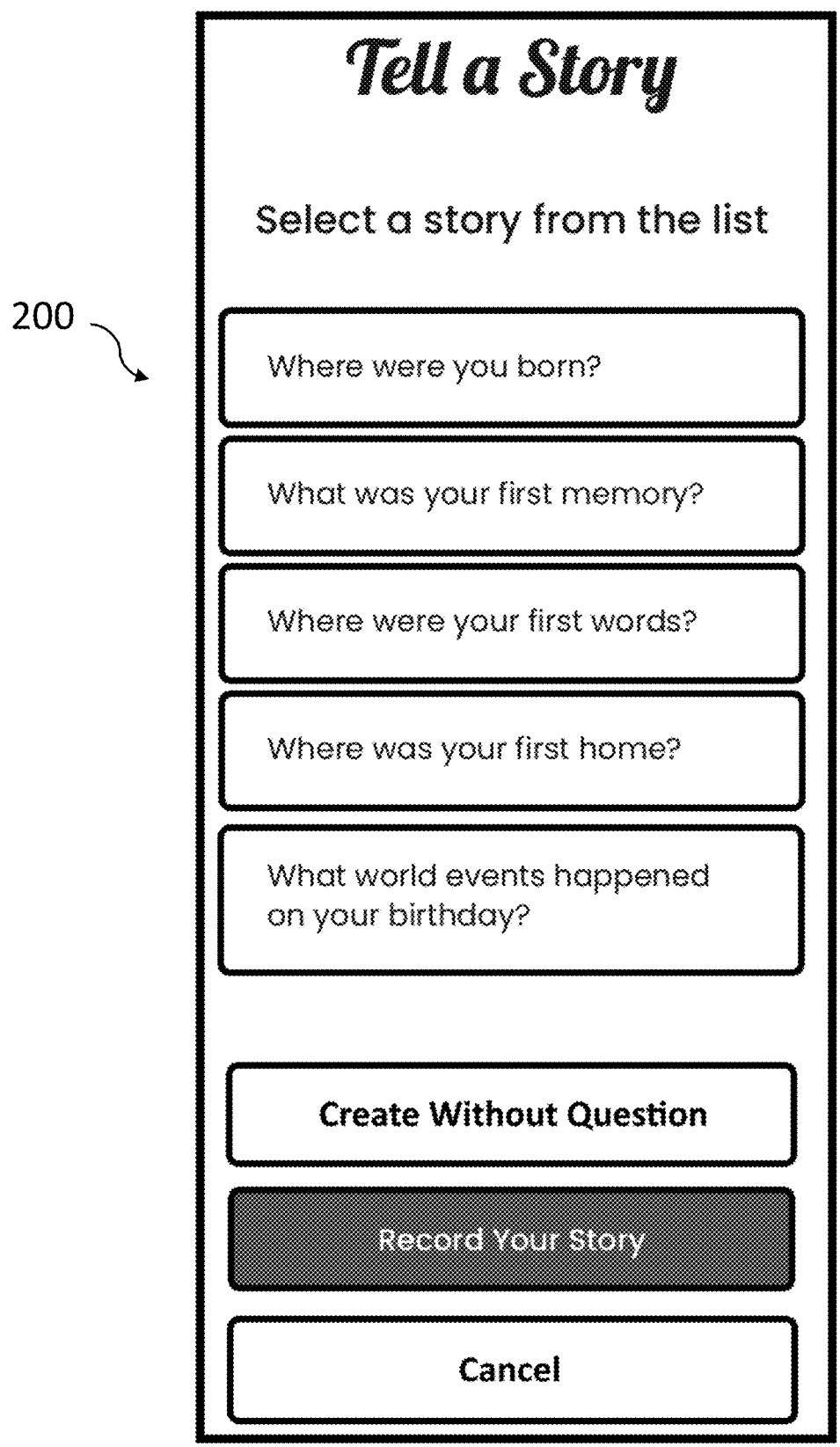
FIG. 6 illustrates a GUI for a storytelling prompt menu according to one embodiment of the present invention.

FIG. 6 illustrates a GUI for a storytelling prompt menu 200 according to one embodiment of the present invention. In one embodiment, the application is operable to provide a user with questions and/or prompts to stimulate storytelling and recollection of memories, as illustrated in FIG. 6. In one embodiment, the application is operable to display a storytelling prompt menu 200 on the GUI of a user device. In one embodiment, the application is operable to display a plurality of selectable questionnaire prompts on the GUI of a user device prior to receiving media files. In one embodiment, the application is operable to receive an answer to any of the plurality of selectable questionnaire prompts in the form of a selectable answer, text input, audio input, and/or video input. In one embodiment, the application is operable to associate a media response with an answer to a questionnaire prompt. In one embodiment, the application is operable to categorize a media response with an answer to a questionnaire prompt. In one embodiment, the application is operable to associate a time period with a media response based on an answer to a questionnaire prompt (i.e., the media response is in relation to the user's early childhood because the answer to the questionnaire prompt indicated that the media response discusses the user's first memory). In one embodiment, the questionnaire prompts include those illustrated in FIG. 6. In one embodiment, the questionnaire prompts include other questions than those illustrated in FIG. 6. In one embodiment, the application is operable to proceed with a media recording without receiving an answer to a questionnaire prompt.

Figure 7:
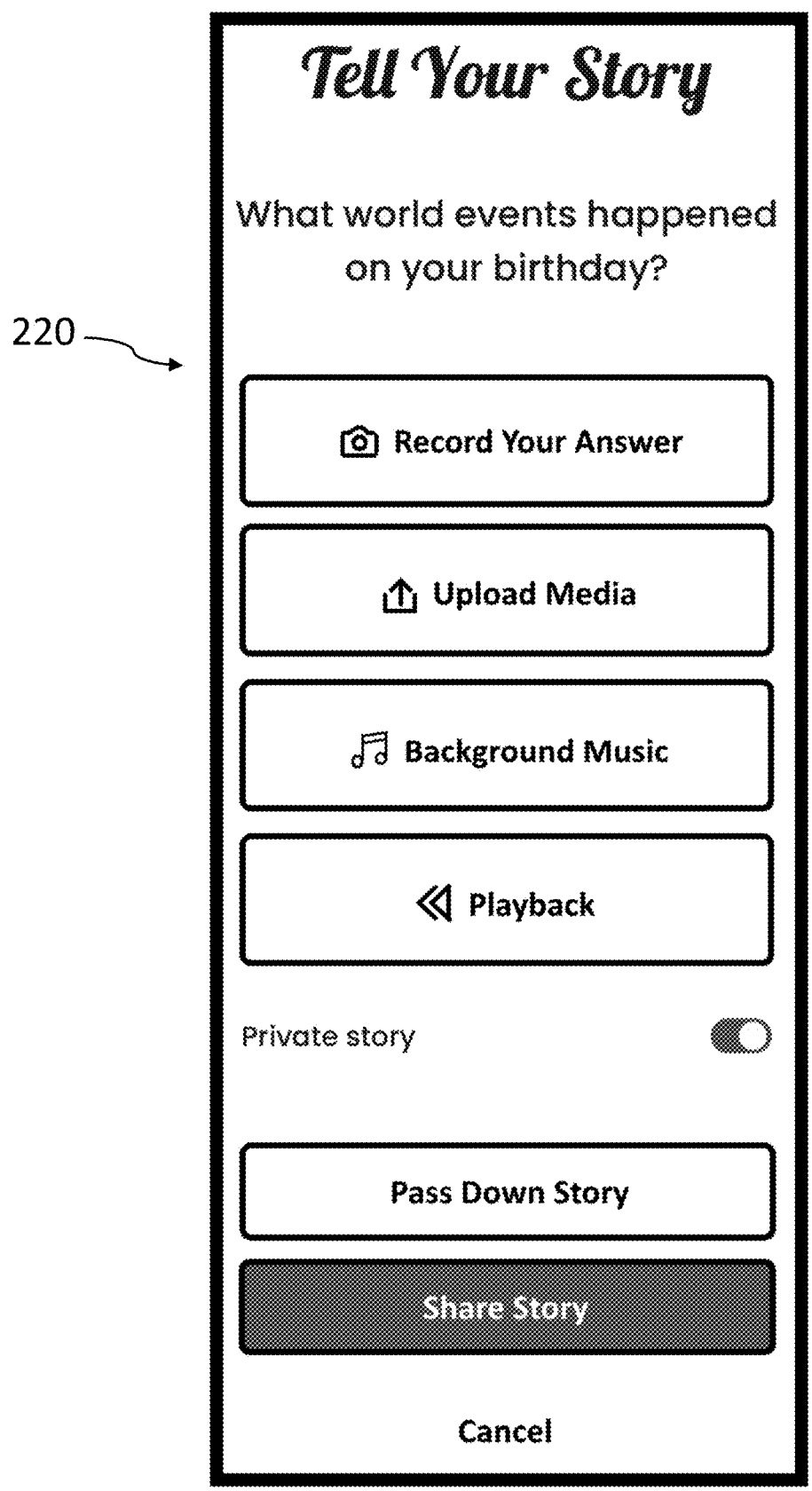
FIG. 7 illustrates a GUI for a storytelling post creation menu according to one embodiment of the present invention.

FIG. 7 illustrates a GUI for a storytelling post creation menu 220 according to one embodiment of the present invention. FIG. 7 illustrates an example GUI of selectable functionalities available to a user when creating a storytelling post. In one embodiment, the application is operable to communicate with the audio and/or video recording device of a user device to record media for a storytelling post. In one embodiment, the application is operable to functionally communicate with the internal memory of the user device running the application, such that media stored on the user device is accessible for a storytelling post. In one embodiment, the application is operable to functionally communicate with a web browser of the user device running the application, such that media found on the internet is accessible for a storytelling post. In one embodiment, the application is operable to access music files stored on the user device running the application or acquired from a web-site on a web browser of the user device of the application for a storytelling post.

In one embodiment, the storytelling post includes an audio recording, video recording, and/or a plurality of photographs that is representative of a story relevant to one's life. In one embodiment, the storytelling post is overlayed with music. In one embodiment, the storytelling post includes transition animations, text overlay, video and/or audio distortions, and other multimedia effects known in the art.

In one embodiment, the application is operable to playback the media used for a storytelling post, such that the GUI of the user device displays the storytelling post prior to sharing its contents with other users of the platform. In one embodiment, the application is operable to flag a storytelling post as private, such that the contents of the storytelling post are inaccessible to certain user profiles of the platform. In one embodiment, the application is operable to archive the contents of a storytelling post, such that it is distributed to a user profile at a predetermined data and time. In one embodiment, the application is operable to share the contents of a storytelling post with other user profiles of the platform. In one embodiment, the application is operable to share the contents of a storytelling post on the social feeds 180 of user profiles of the platform.

In one embodiment, the application of the present invention includes a scan memories feature. In one embodiment, the scan memories feature operates in tandem with a storytelling post. In one embodiment, the scan memories feature is operable to identify past stories through the media (i.e., pictures, videos, memes, etc.) stored on the user device running the application. In this embodiment, the application is operable to apply storytelling prompts to identified media (e.g., explain the story behind this image, etc.), such that a storytelling post is created based on previously created media. In the preferred embodiment, the application is operable to permit the creation of storytelling posts using previously created media, stored on the user device running the application.

In one embodiment, the application of the present invention includes a digital photo scanner feature. In one embodiment, the digital photo scanner feature is operable to functionally communicate with the camera of the user device running the application. In one embodiment, the digital photo scanner feature is operable to scan physical images (i.e., physical photographs, polaroid's, etc.) directly into a storytelling post. In one embodiment, the photo scanner feature is operable to colorize black and white photos scanned into a storytelling post. In one embodiment, the photo scanner feature is operable to identify the edges of a physical photo and crop the digital photo to exclude the area surrounding the edges of the physical photo.

Figure 8:
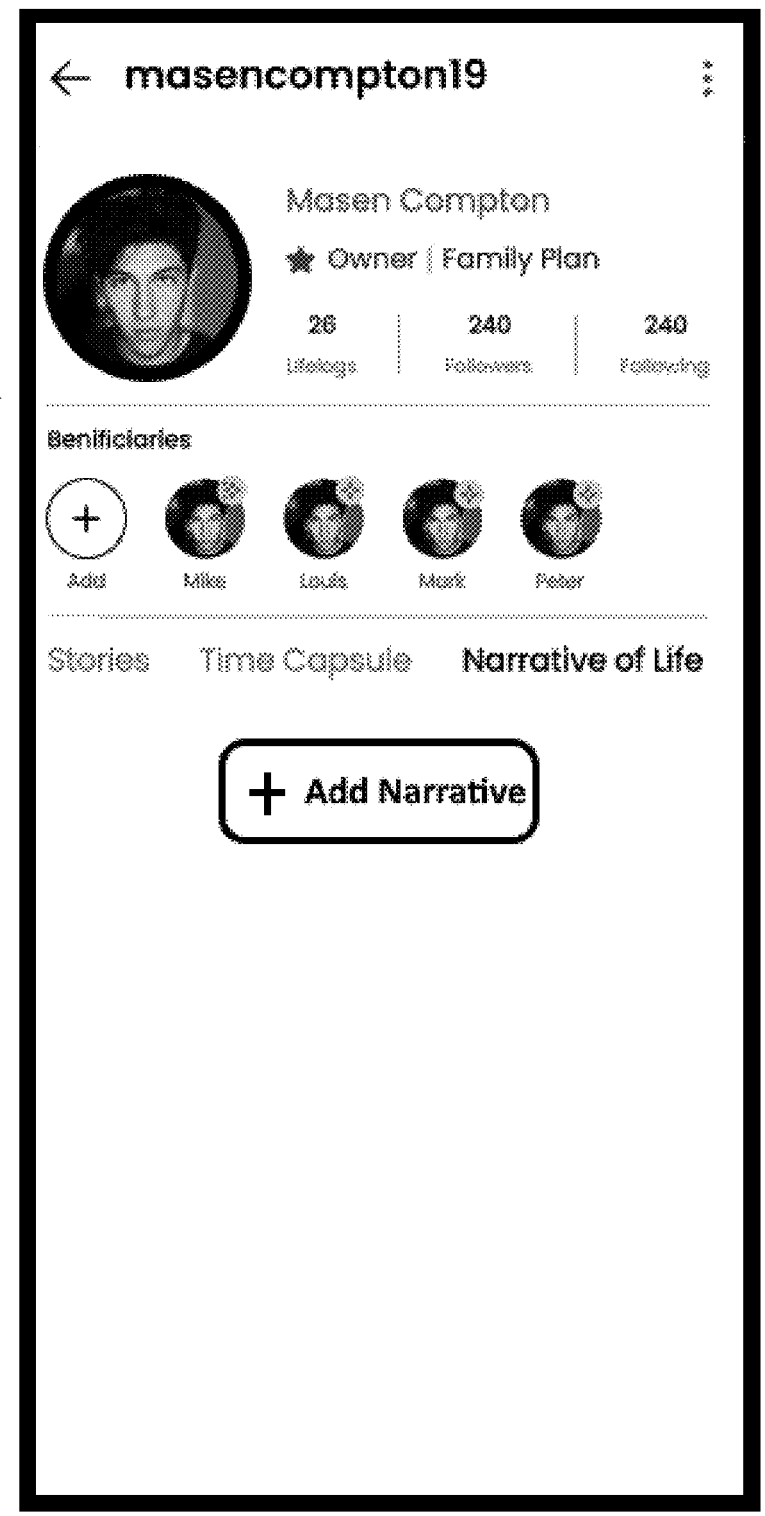
FIG. 8 illustrates a GUI for a narrative of life addition menu according to one embodiment of the present invention.

FIG. 8 illustrates a GUI for a narrative of life addition menu 240 according to one embodiment of the present invention. In one embodiment, the narrative of life addition menu 240 includes a narrative of life addition button. In one embodiment, the narrative of life addition button is operable to create a narrative of life post. In one embodiment, the narrative of life post is a documentary of the life of the individual associated with the user profile making the post. In one embodiment, the narrative of life post is a compilation of storytelling posts and other media created on the platform of the present invention. In one embodiment, the application is operable to automatically create a narrative of life post. In this embodiment, the application is operable to compile storytelling posts in chronological order by either the time the storytelling post was created or by the time associated with the storytelling post (i.e., the time period of the story subject to the storytelling post). In one embodiment, the application is operable to compile storytelling posts by category. In this embodiment, the categories are determined by the answers to the questionnaire prompts provided for storytelling posts. In this embodiment, the application is operable to create the narrative of life post by categorically compiling similar storytelling posts, such that, the narrative of life post includes content associated with a specific time period of a user's life.

Figure 9:
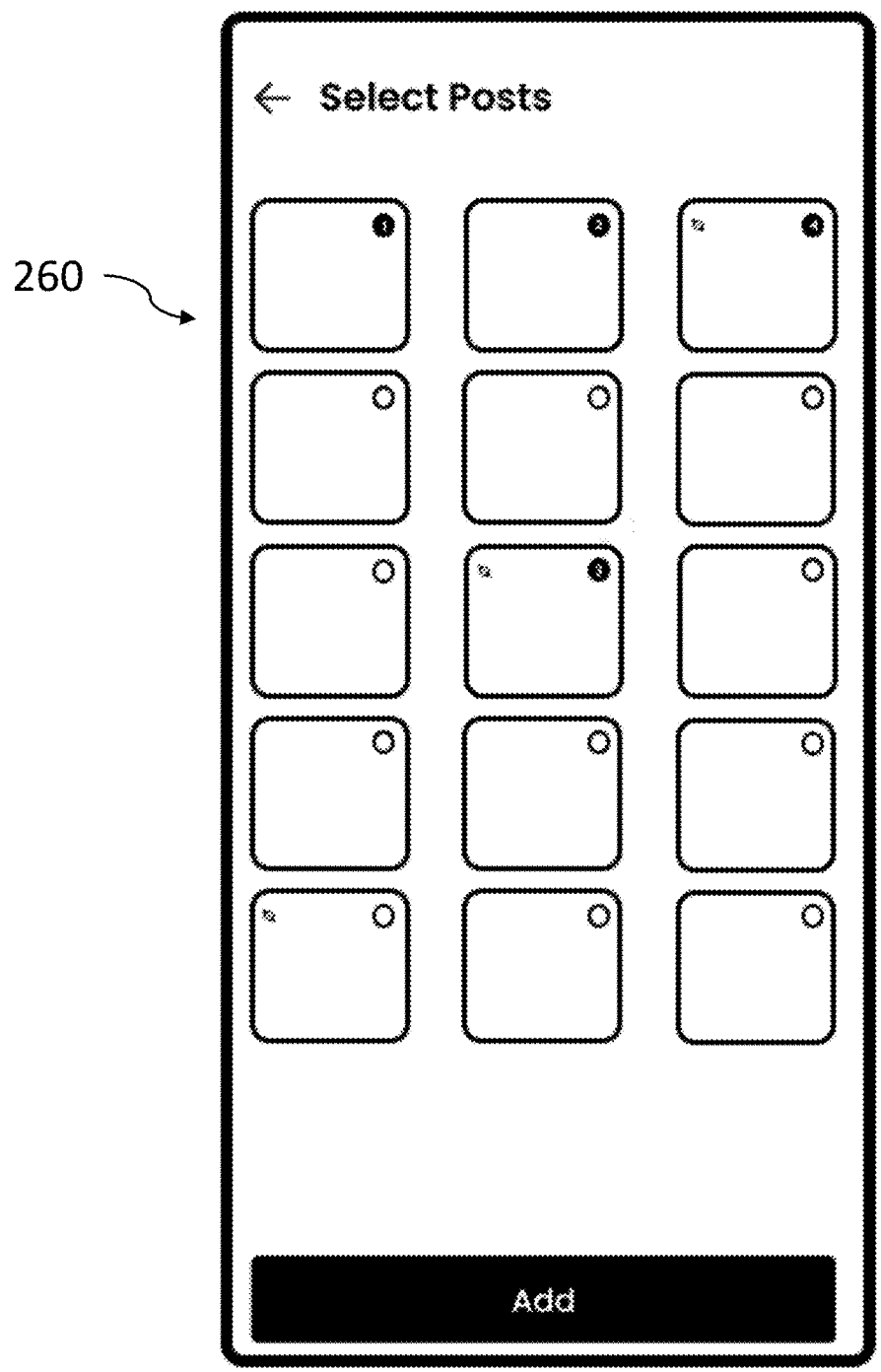
FIG. 9 illustrates a GUI for a narrative of life manual creation menu according to one embodiment of the present invention.

FIG. 9 illustrates a GUI for a narrative of life manual creation menu 260 according to one embodiment of the present invention. In one embodiment, the application of the present invention is operable to manually create a narrative of life post from previously created storytelling posts and/or media stored on the user device running the application. In one embodiment, the narrative of life manual creation menu 260 includes a plurality of selectable previously created storytelling posts, such that all storytelling posts associated with a user profile are present in a single menu. In one embodiment, the application is operable to receive selection input of storytelling posts from a user profile. In one embodiment, the application is operable to compile or stitch together the media contents of selected storytelling posts. In effect, the application is operable to receive a selection of storytelling posts to forego an automatic creation of a narrative of life post in favor of a manual one, wherein selected storytelling posts are stitched or compiled together to create a narrative of life post.

In one embodiment, the application is operable to create a narrative of life post by editing storytelling posts. In this embodiment, the application is operable to add or delete storytelling posts, cut or splice storytelling posts, input or delete audio associated with storytelling posts, and/or add special visual or audio effects to storytelling posts. In effect, the application of the present invention is operable to compile a multitude of storytelling posts into a single form of media, either automatically or manually, to create a documentary of the individual's life associated with a user profile. Additionally, the application of the present invention is operable to create a multimedia representation of a story relevant to one's life. Moreover, the application is operable to provide tools to edit and enhance the story of the user through a variety of functions previously discussed.

Figure 10:
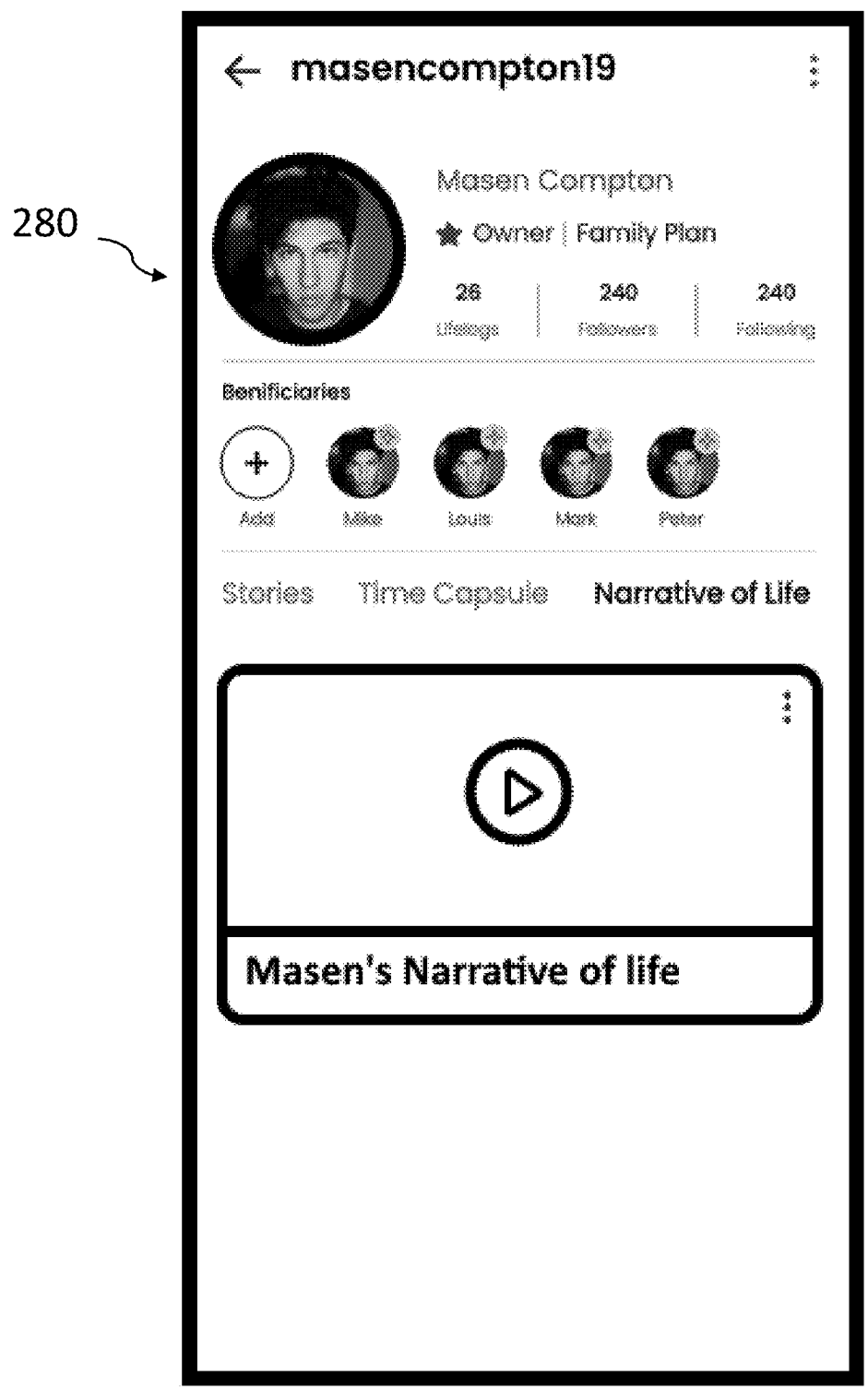
FIG. 10 illustrates a GUI for a user's narrative of life menu according to one embodiment of the present invention.

FIG. 10 illustrates a GUI for a user's narrative of life menu 280 according to one embodiment of the present invention. In one embodiment, the application of the present invention is operable to create one or more narrative of life posts to associate with a single user profile. In one embodiment, the GUI of FIG. 10 is operable to display a plurality of narrative of life posts associated with a single user profile. In one embodiment the options interface includes an edit function, delete function, share function, or privacy function. In one embodiment, the application is operable to display a preview of a narrative of life post, such that a shorten version of the narrative of life post is displayed on the user device. In one embodiment, the narrative of life menu 280 includes an option button that, upon selection, displays a drop-down menu interface with a plurality of options. In this embodiment, the drop-down menu includes selectable options to delete the narrative of life post, edit the narrative of life post, share the narrative of life post, make the narrative of life post private, and archive the narrative of life post. In effect, the narrative of life menu 280 operates as a central hub to manage a plurality of narrative of life posts associated with a user profile.

In one embodiment, a user profile exclusively includes only a single narrative of life post. In this embodiment, a narrative of life post is representative of an all-encompassing, single form of media and/or content that represents the life of a user associated with a user profile. In this embodiment, the platform is not operable to create a plurality of narrative of life posts for a single user profile, rather the platform is operable to only create a single narrative of life post per user profile. In one embodiment, the narrative of life post is created by compiling all of the storytelling posts associated with a single user profile into a single narrative of life post. In one embodiment, a narrative of life post is created only upon the death of a user associated with a user profile. In one embodiment, a narrative of life post is exclusively accessible and visible on by a user of the user profile associated with the narrative of life post (i.e., the subject of the narrative of life post). In one embodiment, a narrative of life post is publicly only upon the death of the user associated with the user profile associated with the narrative of life post (i.e., the subject of the narrative of life post).

Figure 11:
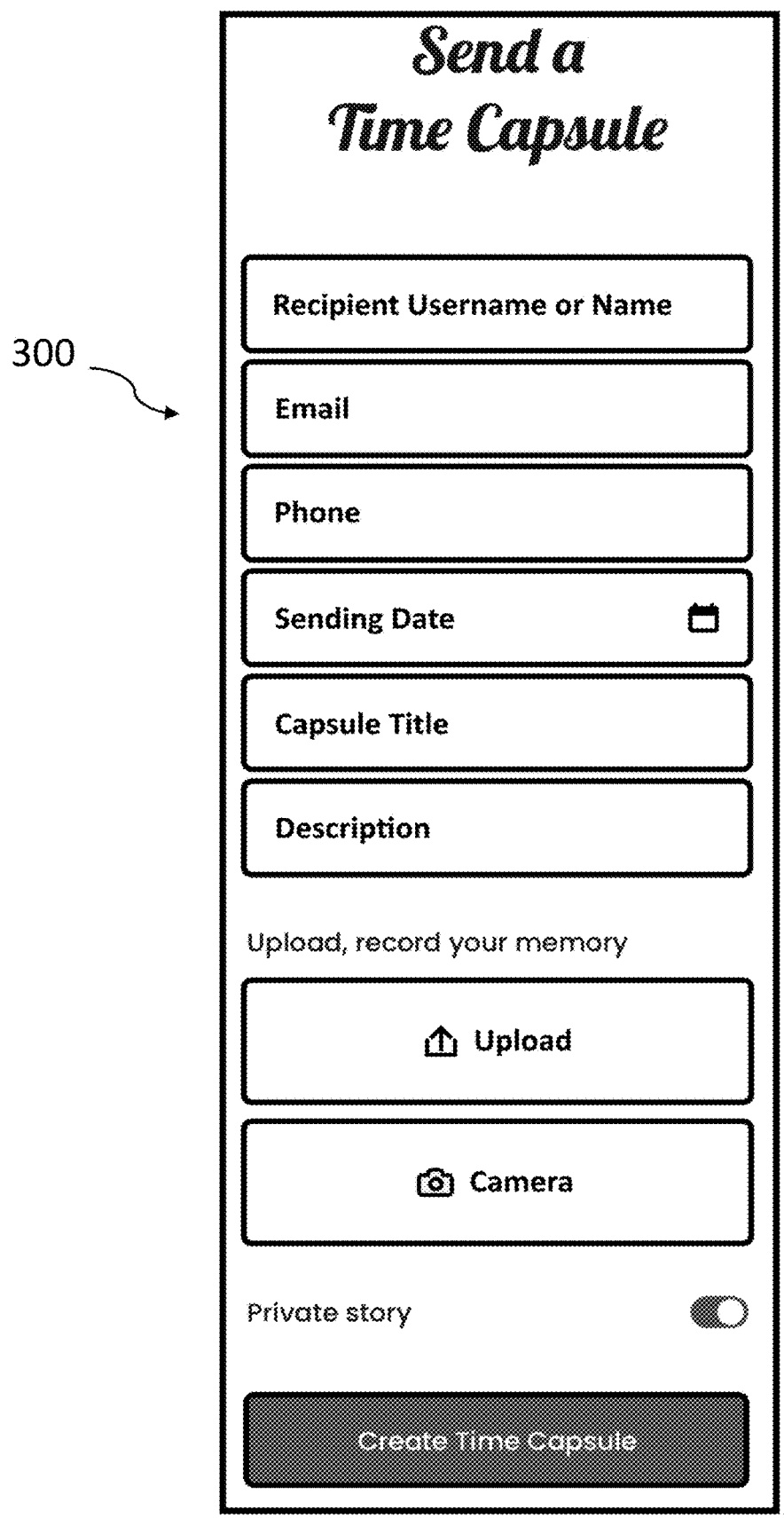
FIG. 11 illustrates a GUI for a time capsule creation menu according to one embodiment of the present invention.

FIG. 11 illustrates a GUI for a time capsule creation menu 300 according to one embodiment of the present invention. In one embodiment, the application of the present invention is operable to store and archive media created through the platform and send the contents to other user profiles at a later, specified date and time. This feature is referred to as the time capsule feature. The GUI of FIG. 11 illustrates an exemplary embodiment of the selectable options and data input fields used to manage storing media and send it to an individual at a later date. In one embodiment, the application is operable to store and send a storytelling post, narrative of life post, audio recording, video recording, photograph, text message, or other multimedia content to a user profile at a specific date and time. In one embodiment, the time capsule feature is operable to send media to a user profile upon the happening of a specified event (i.e., upon a death, upon graduating from an institution, birthday, anniversary, etc.).

In one embodiment, the time capsule feature is operable to utilize location data, geofencing, and/or a map API to send media to a user profile upon a mobile device entering a specified location. In this embodiment, the time capsule feature associates a specific location with the media content contained therein. Geofencing combines the awareness of a user's current location with that of the user's proximity to another location or virtual perimeter associated with a real-world geographic area. By including location data with the time capsule feature, the media associated with the time capsule is accessible to a user profile upon movement to a specified area. In one embodiment, upon creation of a time capsule location data is automatically received from a GPS unit of the device creating the time capsule and/or the platform prompts for location data input, enabling a user to input a desired location to associate with the time capsule. In one embodiment, upon a display device running the platform entering the area, or a specific proximity to the area, the media associated with the time capsule is presented to a user profile through a mobile application, notification, email, and/or other similar notifying means. In one embodiment, the platform is operable to send a push-notification to the user profile that gained assessed to the stored media. In this embodiment, the push-notification includes a selectable button operable, upon selection, to display the stored media on the display device. Alternatively, the selectable button is operable, upon selection, to transition the GUI of the display device to the social feed of the platform that displays the stored media. Advantageously, by inclusion of the location data, a memory may be tied to a specific location, such that a user being exposed to the media associated with the time capsule experiences not only the media but also the location associated with the media. This allows users to not only see a memory locked in a time capsule but to immerse themselves in the memory by accessing it only upon physically entering the location where the memory was made. In one embodiment, the time capsule feature is operable to trigger, send, and/or notify a user profile of a time capsule upon entering a specified location or upon entering a proximity to a specified location. In one embodiment, the present invention is operable to create location data through a one or more hardware and/or software components. By way of example and not limitation, location data is created by functionally communicating with a GPS unit of a display device, low energy BLUETOOTH based systems such as beacons wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

In one embodiment, the GUI of FIG. 11 includes a plurality of text input fields, operable to receive text input. In one embodiment, the GUI of FIG. 11 includes a plurality of media upload fields, operable to download media and associate it with a time capsule. In one embodiment, the time capsule creation menu 300 includes a recipient username or name field that is operable to associate media with an intended recipient through their legal name or user profile username. In one embodiment, the time capsule creation menu 300 includes a sending date field operable to associate media with an intended date and/or time of dispatch. In one embodiment, the application is operable to send media associated with a time capsule to the intended recipient on the date and/or time input into the sending date field. In one embodiment, the time capsule creation menu 300 includes an email field operable to associate media with an intended recipient through an email associated with a user profile. In one embodiment, the application is operable to send the time capsule, upon the scheduled date and time occurring, to the email listed in the email field. In one embodiment, the time capsule creation menu 300 includes a phone number field operable to associate media with an intended recipient through a phone number associated with a user profile. In one embodiment, the application is operable to send the time capsule, upon the scheduled date and time occurring, to the phone number listed in the phone number field. In one embodiment, the time capsule creation menu 300 includes a calendar button operable, upon selection, to display a drop-down calendar interface onto the GUI of a user device with selectable dates. In this embodiment, the drop-down calendar interface includes selectable dates, which are operable, upon selection, to input the date selected on the drop-down calendar interface into the sending date field. In one embodiment, the time capsule creation menu 300 includes a time capsule title field operable to receive text input, such that upon the sending of the time capsule to its intended recipient, the time capsule includes a title. In one embodiment, the time capsule creation menu 300 includes a description field, which is operable to receive text input to associate with the time capsule, such that the recipient receives a message or a description along with the media associated with the time capsule. In one embodiment, the application is operable to post the time capsule to the social feed 180 upon the happening of a specified event or upon the occurrence of a specified date and time.

In one embodiment, the time capsule creation menu 300 includes an upload button operable, upon selection, to cause the GUI of a user device to display an upload interface. In this embodiment, the upload interface is operable to access the internal storage unit of the user device running the application and display a selectable list of media files, such that a media file is uploaded to and associated with a time capsule upon selection. In one embodiment, the upload interface is operable to access a web browser on the user device running the application and display a selectable list of media files, such that a media file is uploaded to and associated with a time capsule upon selection. In one embodiment, the upload interface includes a selectable list of media files created through the platform of the present invention, such that a media file is uploaded to and associated with a time capsule upon selection. In one embodiment, the time capsule creation menu includes a camera button operable, upon selection, to functionally access the camera of a user device running the application. In this embodiment, the application is operable to upload and associate media captured by the camera of the user device, in real time, to the time capsule. In one embodiment, media associated with a time capsule through the upload button is sent to the intended recipient upon the sending date occurring.

In one embodiment, the contents of the time capsule are sent to a user profile of the platform through a notification on the user device running the application, such that the intended recipient is displayed the contents of the time capsule. In one embodiment, the contents of the time capsule are sent to its intended recipient through an email, text, notification, and/or phone call.

Figure 12:
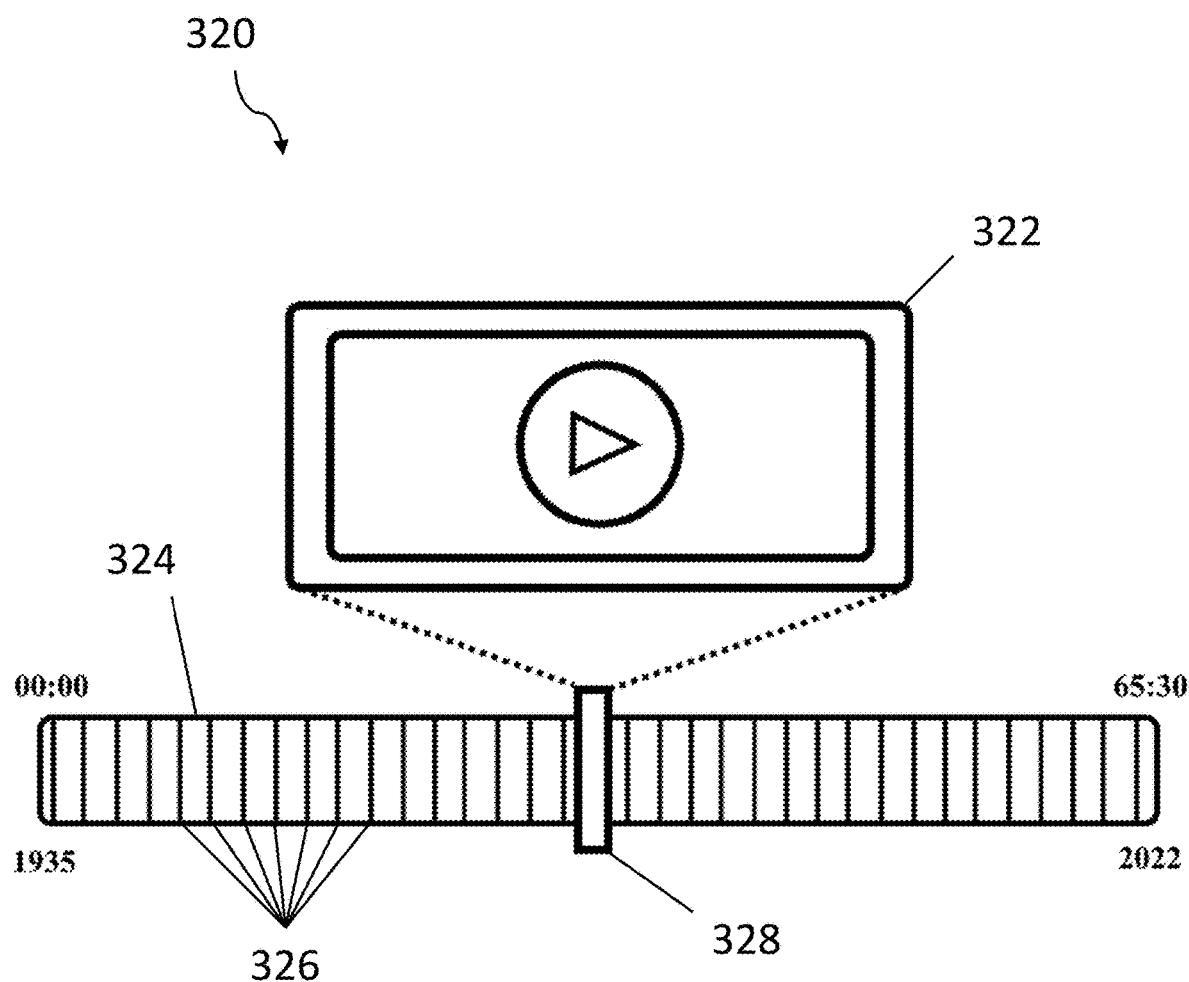
FIG. 12 illustrates a GUI for a time slider interface according to one embodiment of the present invention.

FIG. 12 illustrates a GUI for a time slider interface 320 according to one embodiment of the present invention. Specifically, the GUI of FIG. 12 includes a time slider interface 320, a media player 322, a time bar 324, a plurality of media segments 326, and a scroll bar 328. In one embodiment, the application of the present invention is operable to create a time slider interface that is representative of media created and/or uploaded on the platform. In one embodiment, the time slider is an elongated temporal bar displayed through the GUI of the user device running the application that represents the chronological order of content associated with a narrative of life post. In one embodiment, the plurality of media segments 326 correspond to content associated with the platform of the present invention. As an example, the plurality of media segments 326 correspond to a plurality of storytelling posts chronologically order to make a narrative of life post. In this example, the narrative of life post is represented by the time bar 324 and the plurality of storytelling posts are represented by the plurality of media segments. In one embodiment, the time slider interface 320 is an interactive interface operable to display different media segments 326 depending on the position of the scroll bar 328. In one embodiment, the time slider interface 320 is operable to display one or more media player 322 upon selection of a media segment 326. In one embodiment, the media player 322 is displayed upon hover selection of the media segment (i.e., when a user hovers over a media segment 326 with a selection tool, the media player 322 is displayed). In one embodiment, the one or more media players 322 are generated corresponding to audio and/or video files corresponding to the media segments 326 on the time bar 324. In one embodiment, the time slider interface 320 provides a time line perspective of media uploaded to and/or created through the platform. In one embodiment, the time slider interface is interactive and dynamic by receiving sliding input of the scroll bar 328.

In one embodiment, the time bar 324 includes a plurality of media segments 326, which are representative of a plurality of storytelling posts. In one embodiment, the time bar 324 is representative of a narrative of life post. In one embodiment, the media player 322 includes a play button that is operable to play one or more audio or visual files corresponding to the plurality of media segments 326 upon which the scroll bar 328 is located. In one embodiment, the time bar 324 includes a plurality of time stamps that represent the time associated with the content, the length in minutes of the content, and/or the amount of time remaining on the time bar 324. In one embodiment, the time bar 324 includes a selectable scroll bar 328, that is operable to be selectively moved along the length of the time bar 324. In one embodiment, movement of the scroll bar 328 correspondingly affects the content displayed in one or more media players 322, such that the position of the scroll bar 328 on the time bar 324 is operable to display different media segments 326. In effect, the GUI of FIG. 12 is operable to display a visual representation of a user's life and gives a user the ability to selectively scroll through different periods of an individual's life. The time slider interface creates a dynamic and interactive experience of the narrative of life content so that a user is able to select specific time periods upon which to view.

In one embodiment, the time slider includes content of a storytelling post, a narrative of life post, and/or other media created on the platform. In one embodiment, a time bar 324 is automatically created upon the creation of a narrative of life post, such that the media segments 326 correspond to each storytelling post that makes up the narrative of life post. In one embodiment, the scroll bar 328 is operable to automatically snap to the beginning or end of a media segment 326 depending on the position of the scroll bar 328, such that movement of the scroll bar 328 initiates a playing of media on the media player 322 at the beginning of the media rather than confusingly in the middle of a story.

In one embodiment, the time bar 324 is of a size and length corresponding to the length, in time, of the content associated with the plurality of media segments 326. In one embodiment, the time bar 324 is of a size and length corresponding to the total time of the plurality of media segments 326. In one embodiment, the time bar 324 is of a size and length corresponding to the total time it takes to display or view the entirety of the time bar 324. In one embodiment, the time bar 324 is split into one or more segments. In one embodiment, the time bar 324 is a predetermined set size and length, regardless of the length of the plurality of media segments 326. In one embodiment, the GUI of FIG. 12 is operable to stretch or shrink the visual representation of the plurality of media segments 326, such that the time bar 324 remains the same size and length regardless of the length of the plurality of media segments 326. In one embodiment, the GUI of FIG. 12 is operable to display a portion of the time bar 324 without a plurality of media segments 326 (i.e., blank space), such that the blank space indicates space that is operable to be filled with more content. In one embodiment, the plurality of media segments 326 are displayed in a variety of sizes and lengths that correspond to the length in time of the media associated with the segment. In one embodiment, the plurality of media segments 326 are of a larger or smaller size and length than neighboring media segments 326. As an example, a media segment 326 that represents a storytelling post that is ten minutes in length will be twice as long as a media segment 326 that represents a storytelling post that is five minutes in length.

Figure 13:
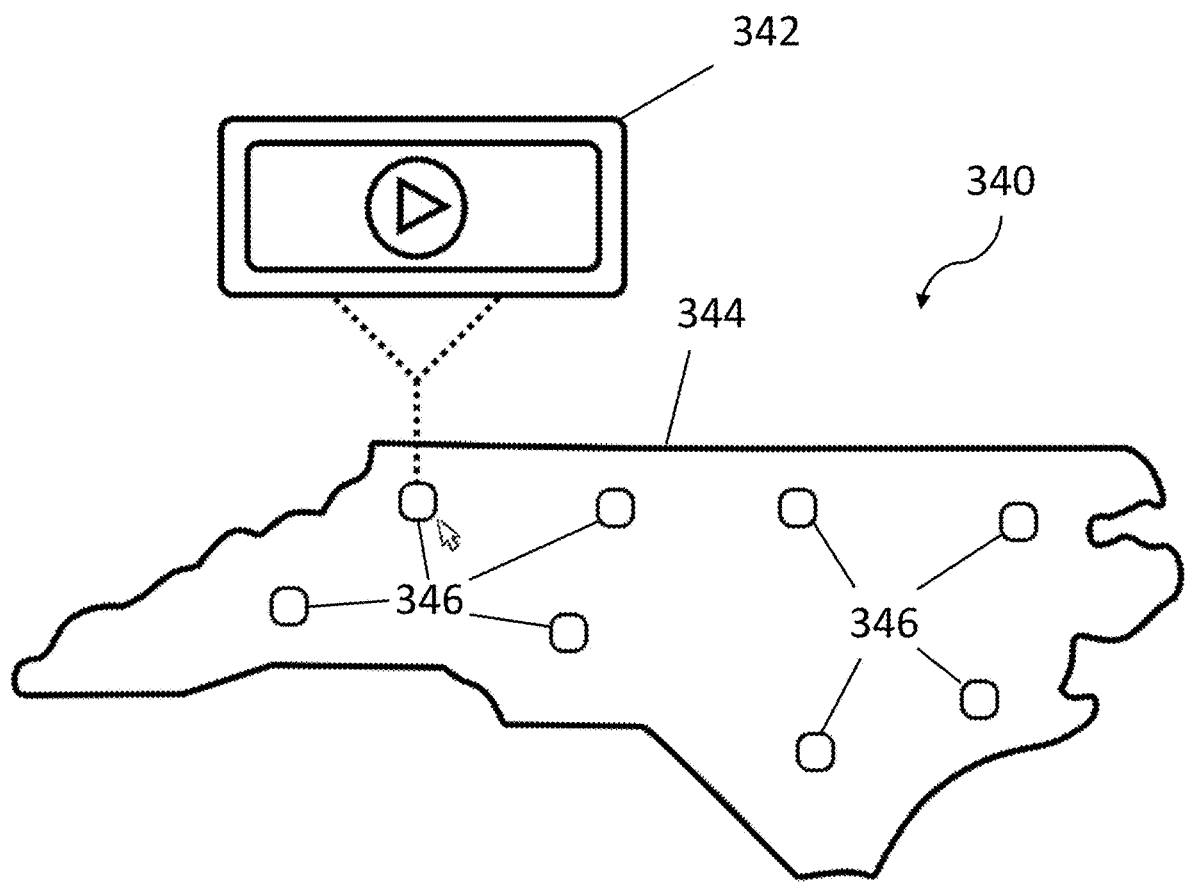
FIG. 13 illustrates a GUI for a location overlay interface according to one embodiment of the present invention.

FIG. 13 illustrates a GUI for a location overlay interface 340 according to one embodiment of the present invention. In one embodiment the location overlay interface 340 provides a location-specific interactive experience with a narrative of life post. The location overlay interface 340 is operable to display a representation of the physical location of where events in a user's life took place, so that an observer can understand the geospatial aspect of the user's life story. In one embodiment, a story telling post, narrative of life post, time capsule, and/or other media content created on the platform is associated with a geographical location and represented on a location overlay interface 340. In one embodiment the geographical location data is manually input into the storytelling post, narrative of life post, time capsule, or other media. In one embodiment, a storytelling post includes a prompt that inquire about the geographical location associated with a story and associates the storytelling post with a geographical location based on the answer given to the prompt. In one embodiment, the geographical location data associated with media created on the platform is automatically determined by functional communication with geospatial sensitive device (e.g., a Global Positioning System (GPS) unit) on the user device running the application.

Specifically, FIG. 13 includes a location overlay interface 340, a media player 342, a map overlay 344, and a plurality of location markers 346. In one embodiment, the map overlay 344 is of a size and shape to visual represent a geographic location. As an example, the map overlay 344 illustrated in FIG. 13 visually represents the state of North Carolina, although one skilled in the art will understand that the map overlay 344 is configurable to represent any geographical territory. In one embodiment, the map overlay 344 includes a plurality of location markers 346, that correspond to a storytelling post, narrative of life post, or other media created on the platform. In one embodiment, the media player 342 is operable to display media associated with the location marker 346. In one embodiment, the media player 342 is operable to display the media of a media objects 346 upon selection a specific media object. In one embodiment, the GUI of FIG. 13 is operable to create a plurality of location markers 346 upon the creation of a storytelling post, narrative of life post, or other media created on the platform. In one embodiment, the application is operable to position the plurality of location markers 346 onto the map overlay 344, such that the location of the location markers 346 correspond to the latitudinal and longitudinal coordinates associated with the content the location markers 346 represent and/or where the media being depicted was created or posted. In one embodiment, the application is operable to automatically create a location overlay interface 340 upon the creation of media content on the platform. In one embodiment, the application is operable to manually create a location overlay interface 340 after the creation of media content on the platform. In one embodiment, the application is operable to edit the location overlay interface 340. In one embodiment, the application is operable to edit the positions of the location markers 346 by inputting location data. In one embodiment, the plurality of location markers 346 are merely representative of the relative location associated with content on the platform. In one embodiment, the outer boundaries of the plurality of location markers 346 are manually defined, such that the location markers are a different size and shape than other location markers. In one embodiment the plurality of location markers 346 overlap. In one embodiment, a location marker 346 is representative of multiple content posts, such that upon selection of a single location marker 346, one or more content posts are displayed. In one embodiment, the plurality of location markers 346 are operable to merge one or more content posts when the one or more content posts are associated with the same location or another location that is relatively close to another location. In effect, the GUI of FIG. 13 is operable to display the geographical aspects of one's life, so that a user is presented with location-specific media to better understand an individual's life story. The location overlay interface 340 creates a dynamic and interactive experience of content created on the platform so that a user is able to select media to view based on location. Therefore, a user better understands aspects of an individual's life by knowing when and where events took place.

In one embodiment, the application of the present invention includes a here and now feature. In one embodiment, the here and now feature is operable to send a plurality of invitation associated with an event to users of the platform and request a video or audio response accompanied by a prompt. In one embodiment, the here and now feature is operable to automatically compile the video and/or audio responses. In one embodiment, the here and now feature is operable to associate videos, audio recordings, and photographs taken at a location with a specific event. In one embodiment, the here and now feature is operable to automatically compile videos, audio recordings, and photographs taken at a location and associate them with a specific event. In one embodiment, the here and now feature is operable to edit content/media compiled and associated with a specific event. In one embodiment, the here and now feature is operable to functionally communicate with a Global Positioning System (GPS) or IP address of the user device running the application and determine geolocation data. In one embodiment, the here and now feature is operable to utilize geolocation data to associate a physical location with a virtual perimeter for the physical location (or "geofence"). In one embodiment, the here and now feature is operable to compile content created within a geofenced location into a single form of media. In one embodiment, the here and now feature is operable to send notifications to user devices within a geofenced location when media content is created within the geofenced location. In one embodiment, the here and now feature is operable to create a proximity defined social feed, such that content created within the geofenced area is displayed on the social feed.

In one embodiment, the here and now feature includes a business portal where all businesses invited to the here and now event access information associated with the event. In one embodiment, the here and now feature provides the option to invite a user profile as a potential attendee or to invite a user profile as a business or vendor. Upon acceptance of a business invitation, the user profile accesses a business portal which includes details of the event, special information, time capsules, location details, RSVP dates, what equipment to bring, attire, and/or other information associated with the event. In one embodiment, user profiles receiving invitations as attendees and as businesses have access to all media created and associated with the event. In one embodiment, access to the business portal provides the user profile with additional administrative privileges. In this embodiment, the business portal allows the user profile to invite other user profiles, input information regarding business activities (i.e., billing, equipment standards, accommodations, etc.), and have access to business information associated with other business invitees.

In one embodiment, the platform includes an immediate capture or "rememery it" feature which provides for opening a camera GUI on a device upon the device accessing the application of the present invention. By opening a camera GUI upon the opening the application, the present invention provides for a device to instantaneously capture media upon the application starting up. In one embodiment, the camera automatically begins recording a video upon the application being opened. Alternatively, the application must receive an input from a user to begin recording a video, taking photographs, or recording audio. The immediate capture feature enables immediate capture of images, audio, and/or video in situations where the delay from the steps of opening the mobile application, selecting a camera GUI within the application, and capturing images or video could cause significant moments not to be captured or not to be completely captured. Examples of significant moments, include, but are not limited to, a child's first words, a child's first steps, fast moving objects, etc. In one embodiment, all media captured through the immediate capture feature are saved to a cloud platform, such that the media is easily shared with or transferred to other user profiles. In one embodiment, the platform includes a selectable option to enable the immediate capture feature upon startup of the application or disable the immediate capture feature upon startup of the application.

In one embodiment, the platform includes a memory perspective feature. In this embodiment, a storytelling post requires input from multiple user profiles to provide a perspective on the event, such that the post becomes a collaborative post. Upon initiation of a storytelling post, the creating user profile sends a request to other user profiles for their "perspective" on the event or memory. This invitation is operable to provide the invited user profile the ability to add additional content relevant to the event, such that the final story telling post includes media from a plurality of user profiles. Content includes, but is not limited to, text content, images, video, and/or video. As a nonlimiting example, a user profile creates a storytelling post outlining a night out in the city and the user profile sends a perspective request to the other participants in the night out. In one embodiment, the platform is operable to automatically stich or combine the media inputs to create a single storytelling post. In one embodiment, the collaborative storytelling post includes an option to make the post public, private, or family only. The platform is operable to use artificial intelligence and/or machine learning to combine the media inputs to create the single storytelling post. In one embodiment, media or content from the creator of the storytelling post is prioritized over media from other contributing user profiles such that more media or content from the creator of the storytelling post is provided compared to media or content from the other contributing user profiles. Alternatively, the platform is operable to receive an input designating a lead storyteller for the storytelling post and prioritizes media or content from the user profile corresponding to the lead storyteller. This embodiment provides for emphasis on the perspective of a user who has a significant life event related to the storytelling post, or is otherwise important for the storytelling post. For example, a perspective of a user who has a birthday, a wedding, a bachelor party, a bachelorette party, an anniversary party, a retirement party, or another celebration is emphasized or weighted compared to the perspective of other users associated with the event.

In one embodiment, the platform includes a storytelling request feature. In this embodiment, the platform enables a user profile to request the creation of a storytelling post to another user profile. The storytelling request feature enables a user profile to input a prompt in the form of a questions and send the request with accompanying prompt to another user profile to answer through a voice over, video, photograph, and/or a text-based response. In one embodiment, the request is sent through a messaging within the platform, a notification, an email, and/or a storytelling section. As a nonlimiting example of this functionality, a user profile sends a storytelling request to their mother with the prompt "What was it like in the household the first month I was born?" The prompt is then sent to a user profile associated with the mother (or through an email to an email address associated with the mother), where a storytelling post creation menu (such as that illustrated in FIG. 6) is accessed to respond to the prompt.

In one embodiment, the platform includes a relationship identifier and request feature. In this embodiment, a user profile sends a relationship request to another user profile which outlines the relationship requested to be established, such as a brother-sister relationship, mother-daughter relationship, uncle-nephew relationship, cousin-cousin relationship, etc. Upon acceptance of the request, the user profiles are linked as family members in a family group. In one embodiment, upon acceptance of the request, a text-based identifier is included on the user profile that indicates the relationship. In one embodiment, this data is utilized to automatically create the family tree discussed in more detail below. In one embodiment, the relationship identifier request is accompanied by a verification system operable to verify the authenticity of the proposed relationship (i.e., birth certificate, state identification, etc.). In one embodiment, the relationship status of user profiles is utilized for targeting channels and advertisements.

In one embodiment, the platform includes a memorial account feature. In this embodiment, the platform is operable to create a user profile associated with a deceased individual, such that their life story may be preserved on the platform for others to view. A user profile, usually one associated with the profile of the deceased individual, is provided the means to create a user profile for a deceased individual that includes storytelling posts, time capsules, and narrative of life posts about the deceased individuals. In one embodiment, creation of the memorial account (i.e., memorial profile) requires verification of the identity of the creating profile and a proper relationship (e.g., familial) to the deceased individual. In one embodiment, a user profile (i.e., the creating profile) is provided administrative privileges over the memorial account. In one embodiment, the verification is established through presentation of a death certificate. In this embodiment, the creating profile provides the platform with a death certificate of the deceased individual to verify that a memorial account may be accurately made and managed by the creating profile. In one embodiment, the verification is established through presentation of legal documentation, such as a power of attorney or a will and testament. In this embodiment, the power of attorney must confirm the authority of the creating profile over the deceased individual. In this embodiment, the will and testament must outline that the creating profile is the executor or heir of the deceased individual. In one embodiment, the verification is established through a form of relationship proof, such as a birth certificate, marriage certificate or license, adoption papers, guardianship appointment papers. In one embodiment, the verification is established through written consent of the deceased individual. In this embodiment, verification is established upon presentment of a signed document outlining the deceased's consent to having a memorial account created and managed on their behalf. In one embodiment, the verification is established through a collaborative effort. In this embodiment, upon request to create the memorial account, known contacts of the deceased (e.g., family members identified in the platform) are notified of the request and provided the option to accept or deny the account creation request. In one embodiment, the verification is established through administrative acceptance. In this embodiment, the creating profile has a video conference or other communication with a platform administrator to establish authenticity. In one embodiment, the verification is established through a third-party service that specializes in document authenticity (i.e., birth certificates, death certificates, etc.). In one embodiment, the present invention is operable to use any one or any combination of verification methods described herein.

In one embodiment, the platform is operable to store data associated with a storytelling post, social post, narrative of life post, and/or a time capsule post on a distributed ledger, e.g., a blockchain. In one embodiment, the platform is operable to send data associated with a storytelling post, social post, narrative of life post, and/or a time capsule post on a distributed ledger. Distributed ledger technology refers to an infrastructure of replicated, shared, and synchronized digital data that is decentralized and distributed across a plurality of machines, or nodes. The nodes include but are not limited to a mobile device, a computer, a server, and/or any combination thereof. Data is replicated and synchronized across a network of nodes such that each node has a complete copy of the distributed ledger.

The blockchain is a commonly used implementation of a distributed ledger and was described in Satoshi Nakamoto's whitepaper Bitcoin: A Peer-to-Peer Electronic Cash System, which was published in October 2008 and which is incorporated herein by reference in its entirety. In the blockchain, additional data is added to the ledger in the form of a block. Each block is linked to its preceding block with a cryptographic hash, which is a one-way mapping function of the data in the preceding block that cannot practically be computed in reverse. In one embodiment, a timestamp is also included in the hash. The computation of the cryptographic hash based on data in a preceding block is a computationally intensive task that could not practically be conducted as a mental process. The use of cryptographic hashes means that each block is sequentially related to the block before it and the block after it, making the chain as a whole immutable. Data in a block in a preferred embodiment cannot be retroactively altered after it is added to the chain because doing so changes the associated hash, which affects all subsequent blocks in the chain and which breaks the mapping of the preceding block. The blockchain is an improvement on existing methods of data storage because it connects blocks of data in an immutable fashion. Additionally, the blockchain is then replicated and synchronized across all nodes in the system, ensuring a distributed ledger. Any attempted changes to the blockchain are propagated across a decentralized network, which increases the responsiveness of the system to detect and eliminate fraudulent behavior compared to non-distributed data storage systems. The blockchain and the distributed ledger solve problems inherent to computer networking technology by providing a secure and decentralized way of storing data that is immutable and has high fault tolerance. The distributed ledger stores digital data and is thus inextricably tied to computer technology. Additional information about the blockchain is included in The Business of Blockchain by William Mougavar published in April 2016, which is incorporated herein by reference in its entirety.

In one embodiment, the data added to the distributed ledger of the present invention include digital signatures. A digital signature links a piece of data (e.g., a block) to a digital identity (e.g., a user account). In one embodiment, the digital signature is created using a cryptographic hash and at least one private key for a user. The content of the piece of data is used to produce a cryptographic hash. The cryptographic hash and the at least one private key are used to create the digital signature using a signature algorithm. The digital signature is only operable to be created using a private key. However, the digital signature is operable to be decoded and/or verified using a public key also corresponding to the user. The separation of public keys and private keys means that external parties can verify a digital signature of a user using a public key but cannot replicate the digital signature since they do not have a private key. Digital signatures are not merely electronic analogs of traditional physical signatures. Physical signatures are easily accessible and easily replicable by hand. In addition, there is no standard algorithm to verify a physical signature except comparing a first signature with a second signature from the same person via visual inspection, which is not always possible. In one embodiment, the digital signatures are created using the data that is being linked to the digital identity whereas physical signatures are only related to the identity of the signer and are agnostic of what is being signed. Furthermore, digital signatures are transformed into a cryptographic hash using a private key, which is a proof of identity of which there is no physical or pre-electronic analog. Digital signatures, and cryptographic hashes in general, are of sufficient data size and complexity to not be understood by human mental work, let alone verified through the use of keys and corresponding algorithms by human mental work. Therefore, creating, decoding, and/or verifying digital signatures with the human mind is highly impractical.

In one embodiment, the present invention further includes the use of at least one smart contract, wherein a smart contract includes a set of automatically executable steps and/or instructions that are dependent on agreed-upon terms. The smart contract includes information including, but not limited to, at least one contracting party, at least one contract address, contract data, and/or at least one contract term. In one embodiment, the at least one smart contract is deployed on a blockchain such that the at least one smart contract is also stored on a distributed node infrastructure. In one embodiment, the terms of the at least one smart contract are dependent on changes to the blockchain. For example, a provision of the at least one smart contract executes when a new block is added to the blockchain that meets the terms of the at least one smart contract. The smart contract is preferably executed automatically when the new block is added to the blockchain. In one embodiment, a first smart contract is operable to invoke a second smart contract when executed. A smart contract is operable to capture and store state information about the current state of the blockchain and/or the distributed ledger at any point in time. Advantageously, a smart contract is more transparent than traditional coded contracts because it is stored on a distributed ledger. Additionally, all executions of the smart contract are immutably stored and accessible on the distributed ledger, which is an improvement over non-distributed, stateless coded contracts. In one embodiment, the state information is also stored on a distributed ledger.

In one embodiment, the beneficiary system, inheritance feature, and/or family network system utilize smart contracts to automate their functions (i.e., the passing of ownership and/or control of content from one user profile to another).

In one embodiment, the application of the present invention is operable to tokenize media content associated with a storytelling post, social post, narrative of life post, and/or time capsule post. A token is a piece of data that is stored on the distributed digital ledger and that can be used to represent a physical and/or a digital asset, e.g., in a transaction, in an inventory. The token is not the media content itself; however, possession and transfer of the token are stored on the distributed digital ledger, thus creating an immutable record of ownership. In one embodiment, the token includes cryptographic hashes of media content data, wherein the media content data is related to the media content. In one embodiment, the media content data is a chain of data blocks. For example, the media content is a work of digital art, and the media content data includes data about the work such as information about the creator, a subject matter, a file type, color data, etc. The corresponding token includes a cryptographic hash of the media content data, which describes the work. Alternative mappings of the media content data to the token are also compatible with the present invention. In one embodiment, the token is a non-fungible token (NFT). A first non-fungible token is not directly interchangeable with a second non-fungible token; rather, the value of the first token and the second token are determined in terms of a fungible unit (e.g., a currency). In one embodiment, the platform is operable to support ETHEREUM standards for tokenization, including, but not limited to, EIP-721: ERC-721 Non-Fungible Token Standard by Entriken, et al., which was published Jan. 24, 2018 and which is incorporated herein by reference in its entirety. In one embodiment, the platform is operable to create fractional NFTs (f-NFTs), wherein each f-NFT represents a portion of the asset. Ownership of an f-NFT corresponds to partial ownership of the asset.

Family-Friendly Artificial Intelligence (AI)

In one embodiment, the application of the present invention is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). In one embodiment, the application of the present invention is operable to use any of the aforementioned learning techniques alone or in combination.

In one embodiment, the application of the present invention is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions, suggestions, and/or models. In the preferred embodiment, the application of the present invention is operable to recommend, suggest, and/or perform actions based on historical data and/or metadata, external data sources, ML, AI, NNs, and/or other learning techniques. In one embodiment, the application of the present invention is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

In one embodiment, the application of the present invention includes a Family-Friendly Artificial Intelligence (AI) or "Time AI." In one embodiment, the Family-Friendly AI serves as an extension of a family by serving as a representative unit of an entire family's culture or of the personality of a particular family member. In one embodiment, the Time AI is operable to facilitate all of the same functions and operations as the Family-Friendly AI. In one embodiment, the present invention includes a Time AI. In one embodiment, the Family-Friendly AI is an artificial intelligence program that utilizes information from the platform (or "historical data") and/or metadata from content posted onto the platform to make suggestions, interact, and create content on the platform. In one embodiment, the Family-Friendly AI utilizes historical data and metadata to refine its functions so they are more specifically tailored to the culture of the family or individual it represents.

In one embodiment, the Family-Friendly AI considers a plurality of types of information or data on the platform and outside sources to automatically learn patterns of family culture. In one embodiment, the Family-Friendly AI is operable to consider storytelling posts, narrative of life posts, social posts, comments, likes, photographs, recipes, locations, videos, friends, tags, holidays, and other information derived from content created on the platform. In one embodiment, the Family-Friendly AI is operable to consider metadata associated with audio, video, photo and/or other media content posted onto the platform as historical data to refine the machine learning process. In one embodiment, the Family-Friendly AI is operable to derive certain information about a family network's culture, preferences, likes, dislikes, and/or history from content created and/or posted on the platform. As an example, the Family-Friendly AI is operable to generate family recipes by analyzing common ingredients in dishes posted by user profiles in the same family network. In one embodiment, the Family-Friendly AI is operable to analyze the metadata of a photo or video posted to the platform to determine locations of family vacations, and make recommendations for future family vacations.

In one embodiment, the Family-Friendly AI is operable to receive voluntary responses from user profiles. In one embodiment, voluntary responses are used to accurately train the Family-Friendly AI to match the culture of the family it represents. In one embodiment, user profiles of a family network provide a plurality of voluntary responses to a Family-Friendly AI. In one embodiment, a voluntary response is a text response, audio response, video response, storytelling post, social post, and/or narrative of life post. In one embodiment, the Family-Friendly AI is operable to utilize voluntary responses as historical data and refine its functions. In one embodiment, the Family-Friendly AI is operable place a heavier consideration on historical data derived from voluntary responses than historical data derived from other sources. In one embodiment, the Family-Friendly AI is operable to engage in an iterative process by continually interacting with user profiles within a family network and utilizing the interactions as historical data. In one embodiment, the Family-Friendly AI is operable to functionally communicate with the internet to receive data, and uses such data as historical data.

In one embodiment, the Family-Friendly AI includes AI image recognition. The AI image recognition is operable to provide the Family-Friendly AI with additional information to use as historical data. In one embodiment, the AI image recognition is a computer vision technique that is operable to interpret, identify, and categorize objects from an image to associate with real world objects, people, places, and/or things. In one embodiment, the AI image recognition is operable to utilize machine learning algorithms to understand images. In one embodiment, the Family-Friendly AI and/or the AI image recognition is operable to utilize the methods disclosed in U.S. Pat. Nos. 11,164,294, 10,860,930, and/or 10,650,041, which are all incorporated herein by reference in their entirety.

In one embodiment, the AI image recognition is operable to identify and categorize images and videos captured on a user device running the application of the present invention. In one embodiment, the AI image recognition is operable to identify and categorize real world objects, persons, places, and things from media content associated with a storytelling post, social post, narrative of life post, and/or time capsule post.

In one embodiment, the Family-Friendly AI is operable to interact with user profiles of the platform by sending messages, notifications, and/or prompts to a display device associated with a user profile. In one embodiment, the Family-Friendly AI is operable to make bespoke suggestions to user profiles of a family network that are tailored to the family culture associated with a family network. In one embodiment, the Family-Friendly AI is operable to generate and suggest cooking recipes based on ingredients and cooking styles passed down through generations. In one embodiment, the Family-Friendly AI is operable to determine a geographical location associated with a family network and suggests recipes native to that geographical location. As an example, the Family-Friendly AI is operable to recognize that a majority of photos or videos posted onto the platform of a single-family network originate or were taken from a common geographic location and associate that geographic location as that of the family associated with the family network. In one embodiment, the Family-Friendly AI is operable to suggest activities or events that align with a family network's culture. In one embodiment, the Family-Friendly AI is operable to determine common trends of family vacations and make vacation suggestions based off those common trends. In one embodiment, the Family-Friendly AI is operable to suggest and organize celebrations of cultural events to user profiles of a family network. In one embodiment, the Family-Friendly AI is operable to recognize that users associated with user profiles of a family network has an upcoming event (i.e., a birthday, quinceañera, Bar Mizvah, Sweet Sixteen, etc.) and make suggestions in accordance with such an upcoming event. In one embodiment, the Family-Friendly AI is operable to suggest books, movies, TV shows, songs, and/or other content that align with the values, cultural heritage, or interests of a family network to user profiles of a family network. In one embodiment, the Family-Friendly AI is operable to create a music playlist (i.e., a list of songs) that align with the values, cultural heritage, or interests of a family network to user profiles of a family network. In one embodiment, the Family-Friendly AI is operable to suggests travel destinations that align with the values, cultural heritage, or interests of a family network to user profiles of a family network. In one embodiment, the Family-Friendly AI is operable to suggest and organize locations to have lunch, dinner, or breakfast that align with the values, cultural heritage, or interests of a family network to user profiles of a family network. In one embodiment, the Family-Friendly AI is operable to suggest and organize family reunions. In one embodiment, the Family-Friendly AI is operable to send out notifications that implement the here-and-now feature of the present invention. In one embodiment, the Family-Friendly AI is operable to determine frequented locations and times of the year where family reunions take place. In one embodiment, the Family-Friendly AI is operable to send invites to user profiles of a family network in connection with a family reunion. In one embodiment, the Family-Friendly AI is operable to manage RSVPs in connection with a family reunion by generating a list of user profiles that have accepted an invitation, declined an invitation, are yet to respond to an invitation, and/or have indicated an uncertain response to an invitation.

In one embodiment, the Family-Friendly AI is operable to recognize a user associated with a user profile's voice and recreate it. In one embodiment, the application of the present invention is operable to identify the voice of a user associated with a user profile and convert the voice to a digital text based on a shared vocabulary dictionary. In one embodiment, the application of the present invention is operable to utilize the voice recognition method disclosed in U.S. Pat. No. 9,947,313, which is incorporated herein by reference in its entirety. In one embodiment, the Family-Friendly AI is operable to recognize a voice in a storytelling post, narrative of life post, social post, and/or time capsule post. In one embodiment, the Family-Friendly AI is operable to recreate the voice of a user associated with a user profile. In one embodiment, the Family-Friendly AI is operable to capture the voice of a user through the voice recognition feature. In one embodiment, the Family-Friendly AI is operable to input captured voice into a narrative of life post. In one embodiment, the Family-Friendly AI is operable to input a captured voice as a transitional phrase in between storytelling voice recordings in a narrative of life post. In this embodiment, the Family-Friendly AI is operable to smooth the dialogue of an automatically generated narrative of life post by using the captured voice of the user associated with the user profile subject to the narrative of life post by inputting the captured voice in between storytelling. In addition, the Family-Friendly AI is operable to correct grammatical errors, mumbled speech, pauses in dialog, recording interference, and smooth out dialogue by utilizing a pattern associated with a user profile's voice. In one embodiment, the Family-Friendly AI is operable to exclusively correct grammatical errors and insert transitional phrases into a narrative of life post. In one embodiment, the Family-Friendly AI is not operable to recreate a voice associated with a user profile of a deceased individual.

In one embodiment, the Family-Friendly AI is operable as a content filter, web browsing moderator, and/or platform browsing moderator. In one embodiment, the Family-Friendly AI is operable to recognize profanity, inappropriate language, mature content, and other media not suitable for young users. In this embodiment, the Family-Friendly AI is operable to block such content from being accessible from certain user profiles. In the preferred embodiment, the platform is operable to recognize an age of an individual associated with a user profile and automatically moderate content on the platform appropriately, such that a young user is not exposed to inappropriate content.

In one embodiment, the Family-Friendly AI is operable to automatically sharpen images and convert black and white images and video into fully colored images and videos. In the preferred embodiment, the Family-Friendly AI is operable to receive digital forms of family history, so that families may upload a plurality of old family photos and home videos. In one embodiment, the Family-Friendly AI is operable to automatically enhance the visual quality or completely overall the color composition of photos and videos. In one embodiment, the present invention is operable to utilize the method disclosed in U.S. Pat. No. 5,696,850, which is incorporated herein by reference in its entirety. In one embodiment, the present invention is operable to utilize the method disclosed in U.S. Patent Publication No. 2022/0301227, which is incorporated herein by reference in its entirety.

In one embodiment, the Family-Friendly AI is operable to automatically categorize content posted onto the platform, video and photographs stored on a user device running the platform, and utilize metadata accompanied by such videos and photographs in a machine learning algorithm. In one embodiment, the Family-Friendly AI is operable to automatically tag a photo or video associated with the platform with a predetermined category. In one embodiment, the Family-Friendly AI is operable to categorize a video or photograph with a tag identifying a user profile subject to the video or photograph. In one embodiment, the Family-Friendly AI is operable to analyze the metadata associated with a photograph or video to determine a location and time accompanying the video or photograph. In this embodiment, the Family-Friendly AI is operable to categorize and tag the video or photograph based on the metadata associated with the video or photograph. In one embodiment, the Family-Friendly AI is operable to utilize the image recognition AI to further categorize the contents and characteristics of photos and videos associated with the platform.

As an example, a user profile in a family network posts a photo of themselves and others at a beach, the Family-Friendly AI is operable to recognize that this photo was taken at the same general location as photos taken by other user profiles of the same family network. The Family-Friendly AI is then operable to categorize all of these photos as photos taken at a family reunion or family vacation. Additionally, the Family-Friendly AI is operable to recognize that previous photos associated with a user profile were taken at the same beach and recognize that the photos were taken roughly a year apart. The image recognition AI is operable to identify the users associated with user profiles in the photo. In effect, the Family-Friendly AI is operable to recognize a common family reunion location and take all content associated with that location accordioning. Additionally, the Family-Friendly AI is operable to recommend the vacation spot, or similar locations to the family network at around the time of year that the individuals of the family network went in previous years. In one embodiment, the Family-Friendly AI is operable to make suggestions in the form of a text message, email, push-notification, or other message on the platform. Furthermore, the Family-Friendly AI is operable to consider this data and similar data to further refine the machine learning algorithm to form a better understanding of the family culture and make more accurate suggestions that align with the family's values. In one embodiment, the metadata is historical data.

In one embodiment, the Family-Friendly AI is operable to analyze metadata associated with a photo or video for a device identifier ("device ID"). In one embodiment, the Family-Friendly AI is operable to associate a device ID with a user profile. In one embodiment, the Family-Friendly AI is operable to utilize a device ID as historical data. In one embodiment, the Family-Friendly AI is operable to associated photos and videos taken by a certain device and tag them as being associated with a specific user profile. In one embodiment, the Family-Friendly AI is operable to identify objects, persons, places, and things using the image recognition AI. In effect, the Family-Filter AI is operable to identify photographs and videos of a user associated with a user profile and connect them to a family network containing the user profile.

In one embodiment, the Family-Friendly AI is operable to analyze a description and title associated with a media post or social post. In one embodiment, the Family-Friendly AI is operable to categorize and tag photographs and videos based on the text input to the description or title. In one embodiment, the Family-Friendly AI is operable to utilize a description or title of a social post, storytelling post, or narrative of life post as historical data. In one embodiment, based on the natural language associated with a media post, the Family-Friendly AI is operable to tag a media post as relating to an object, user, location, family value, or another concept related to family culture. The Family-Friendly AI is operable to utilize the aforementioned data as historical data. As an example, a user profile posts an image and describes a story about their favorite meal made by a family member. The Family-Friendly AI is operable to recognize the name of the dish associated with the social post, associate the family dish with the family network, and suggest recipes or ingredients similar to that family dish to other user profiles of the family network.

In one embodiment, the Family-Friendly AI includes image-to-text synthesis. In one embodiment, the Family-Friendly AI is operable to recognize and identify written words in a photo or video uploaded to the platform and synthesize a text message based on the contents of the written words and use such text message as historical data. In one embodiment, the present invention is operable to utilize the image-to-text method and system disclosed in U.S. Pat. No. 10,853,638, which is incorporated herein by reference in its entirety. As an example, the Family-Friendly AI is operable to receive an image of a written recipe (e.g., a recipe passed down from generation to generation) and synthesize text data based on the contents of the written recipe and use the ingredients to the recipe to suggest new dishes for the family network.

In one embodiment, the Family-Friendly AI includes a voice-to-text synthesis and/or an audio transcription module. In one embodiment, the voice-to-text synthesis is operable to analyze the voice of a user associated with a user profile in a video posted to the platform. In one embodiment, the voice-to-text synthesis is operable to transcribe audio from a video and/or audio file into text. In one embodiment, the Family-Friendly AI is operable to create an audio transcription of a video and/or audio file. In one embodiment, the present invention is operable to utilize the method and system disclosed in U.S. Pat. Nos. 9,318,110 and 11,170,782, which are both incorporated herein by reference in their entirety. In one embodiment, the Family-Friendly AI is operable to utilize a transcription of an audio and/or video files as metadata or historical data. In one embodiment, the Family-Friendly AI is operable to transcribe, analyze, and/or use as metadata audio from a social post, storytelling post, and/or narrative of life post. In effect, the Family-Friendly AI is operable to understand the audio contained in media posted onto the platform and utilize it to better understand the family culture of a family network to provide suggestions in line with the family network.

In one embodiment, the Family-Friendly AI includes an AI chat bot. In one embodiment, the AI chat bot is operable as a chat interface to expand and collect historical data. In one embodiment, the AI chat bot is operable to transmit text to a user profile in the form of a message, email, text message, private message, and/or push notification. In one embodiment, the AI chat bot is operable to receive and categorize text input from a user profile. In one embodiment, the AI chat bot is operable to prompt user profiles with questions, prompts, and/or any other text message from a predetermined list of test messages. In one embodiment, the Family-Friendly AI is operable to utilize text input collected by the AI chat bot as historical data and/or metadata. In one embodiment, the AI chat bot is operable to provide user profiles with prompts in order to acquire historical data, associated with information about past events, family culture, and other contextual information of media posted onto the platform. In one embodiment, the AI chat bot is operable to analyze the contents of previously posted media on the platform and utilize the contents as metadata and/or historical data.

As an example, the Family-Friendly AI is operable to recognize that an image posted onto the platform was taken at a beach, that the image includes plurality of users associated with user profiles of a single-family network, and recognize that the location where the image was taken is the same or similar to that of an image taken roughly a year ago. With this information the Family-Friendly AI is operable to cause the AI chat bot to provide the posting user profile with a prompt akin to "how was your trip at Myrtle Beach?" or "did you enjoy this year's family reunion at Myrtle Beach?" The Family-Friendly AI is operable to utilize the response from the aforementioned prompt as historical data to further refine its understanding of the family culture of the family network.

In effect, the Family-Friendly AI serves as an all-encompassing family network knowledge repository. The Family-Friendly AI employs an iterative process to continually refine its understanding of a family network's culture and make suggestions accordingly. The Family-Friendly AI is operable to analyze information from a plurality of user profiles associated with a family network, generate an understanding of the culture of the family network, and make suggestions that align with the values and culture of the family network. The Family-Friendly AI further includes additional features of benefit to user profiles in a family network.

In one embodiment, the Family-Friendly AI is operable to automatically generate a visual representation of a family tree onto a display device. In one embodiment, the Family-Friendly AI is operable to receive input relating to genealogical data of a user's ancestry. In one embodiment, the AI chat bot is operable to prompt user profiles with questions about their ancestry to use in creating of a family tree. In one embodiment, the Family-Friendly AI is operable to acquire familial data from the beneficiary system and/or the family network system. In one embodiment, the platform includes text fields to input familial data upon account creation. In one embodiment, the Family-Friendly AI is operable to automatically generate a visual representation of the familial relationships of user profiles in a family network. In one embodiment, the family tree includes the oldest generation at the top of a tree, while younger generations are included at the bottom of the tree. Additionally, the Family-Friendly AI is operable to display biographs, obituaries, and other information pertaining to the individuals subject to the family tree on the family tree.

In one embodiment, the Family-Friendly AI is not a digital twin of a specific deceased individual. It is generally known in the art to provide an artificial intelligence program that is operable to create the likeness and image of a person after they have passed away. However, in one embodiment of the present invention, the Family-Friendly AI is not a digital twin of a deceased individual, rather the Family-Friendly AI is operable to serve as an entity that develops an understanding of the family culture and family values of a family network by analyzing historical data associated with user profiles of a family network.

Rememery Lane

In one embodiment, the application of the present invention is operable to create a virtual reality environment called "Rememery Lane." In one embodiment, the application of the present invention is operable to create a virtual reality environment that includes photographs and videos taken from a user device running the application. In one embodiment, the application is operable to create a virtual environment that is representative of and/or similar to the environment where a photograph or video was taken. In one embodiment, the application is operable to create a virtual environment representative of a family culture of a family network generated by the Family-Friendly AI. In one embodiment, the application is operable to create a virtual reality environment based off the metadata associated with a photograph or video posted to the platform. In this embodiment, the application is operable to identify the location where a photograph or video was taken and create a virtual reality environment representative of that location.

In one embodiment, the virtual reality environment generated by the application of the present invention (Rememery Lane) is accessible by a headset configured for virtual reality, augmented reality, and/or mixed reality environments ("AR/VR"). The headset preferably includes a display, an eyewear component, at least one power supply component, at least one image capturing device, and/or control electronics. In one embodiment, the headset is a pair of goggles. Alternatively, the headset is a pair of glasses. In one embodiment, the headset includes at least one head strap. In one embodiment, the power supply component includes at least one battery, at least one supercapacitor, and/or any other similar power supply components. In another embodiment, the battery includes at least one rechargeable battery. In yet another embodiment, the at least one rechargeable battery includes a lithium ion battery.

The headset is configured to receive and display an image of a virtual scene, movie, and/or environment. The headset is further operable to receive audio data and communicate the audio data to a wearer via a speaker, headphones, and other similar audio playback devices. In one embodiment, the headphones are noise-cancelling headphones. The noise-cancelling headphones are configured to block out external noise such that the wearer is completely immersed in the AR/VR environment.

Examples of headsets and/or AR/VR systems include, but are not limited to, those described in U.S. Pat. Nos. 8,217, 856; 8,743,145; 9,094,677; 9,223,136; 9,635,450; 9,671, 614; 9,733,480; 9,734,402; 9,766,462; 9,846,483; 9,858, 703; 9,897,812; 9,989,998; 10,025,060; 10,037,084; 10,055, 645; 10,055,887; 10,061,352; 10,061,391; 10,082,672; 10,102,674; 10,122,990; 10,124,251; 10,133,305; 10,185, 390; 10,209,769; 10,244,226; 10,254,547; 10,261,579; 10,318,007; 10,395,111; 10,419,731; 10,429,647; 10,452, 911; 10,540,003; 10,656,423; 10,656,822; 10,701,342; 10,769,438; 10,825,255; 10,838,206; 10,843,067; 10,890, 941; 10,911,734; 10,922,886; 10,928,613; 10,951,880; 10,979,681; 11,030,719; 11,055,879; 11,106,276; 11,145, 031; 11,145,096; 11,159,713; 11,170,678; 11,217,021; 11,228,745; 11,275,945; 11,281,290; and 11,288,027 and U.S. Patent Publication Nos. 20200049946, 20210243384, and 20220130103, each of which is incorporated herein by reference in its entirety.

In one embodiment, Rememery Lane is visualized, not through a headset, but through a display device, such as a mobile phone or computer screen. In one embodiment, the application of the present invention is operable to create a bespoke visual experience through Rememery Lane by utilizing metadata and historical data obtained by the Family-Friendly AI, AI chat bot, audio transcriber, and/or other source of data on the platform. In one embodiment, the application is operable to display themes of pop culture native to the era represented by Rememery Lane. In one embodiment, Rememery Lane displays a predetermined environment. In one embodiment, Rememery Lane displays a predetermined environment base prior to the collection of historical or meta data. In this embodiment, Rememery Lane is operable to specialize and customize the virtual experience as it collects more historical data and metadata from the user profile. In one embodiment, Rememery Lane is operable to display media content from a social post, storytelling post, narrative of life post, and/or other media posted onto the platform. In one embodiment, Rememery Lane is operable to play audio from a social post, storytelling post, narrative of life post, and/or other media posted onto the platform overtop of a visual experience and other visual content. As an example, Rememery Lane takes the audio from a storytelling post, created by a deceased user associated with a user profile, and overlays it onto a Rememery Lane virtual experience so that the audio of what the deceased individual was describing is overlayed onto a virtual rendering of the location being discussed, moment being discussed, or other similar environment.

In one embodiment, the Rememery Lane is operable to display a linear experience. In one embodiment, the Rememery Lane is operable to display visual content in the form of a tunnel, such that a user spectating the Rememery Lane visualizes media content in a linear fashion (i.e., from the start of the story to the end of a story). In one embodiment, Rememery lane is operable to display a linear experience that is chronological to a user associated with a user profile's life, a specific memorable moment, and/or a story. In one embodiment, Rememery Lane is operable to display alternative routes through its linear experience. In this embodiment, Rememery Lane is operable to receive user input to display a different virtual experience. In one embodiment, Rememery Lane is operable to display alternative routes based on the Family-Friendly AI, metadata, and/or historical data of a family's culture. As an example, Rememery Lane displays a virtual experience of media content associated with a narrative of life post of a deceased individual's life, a user associated with a user profile is given the option to halt the linear experience and instead learn more about a specific experience (i.e., a specific storytelling post). In this example, Rememery Lane is operable to continue the linear experience upon the completion of displaying media associated with the storytelling post.

AI PenPal

In one embodiment, the application of the present invention includes an AI PenPal. In one embodiment, the AI PenPal is a system that is operable to send and receive letters from users associated with a user profile of the platform. In one embodiment, the AI PenPal is not an AI, rather information is manually written by an individual and sent to an address associated with a user profile. In one embodiment, the AI PenPal is operable to send messages, notifications, and/or prompts to a user profile through a display device to warrant a written response in the form of a physical letter. In one embodiment, the platform includes a system where an individual writes a physical letter or prints out a physical letter with prompts to warrant a written response from a user associated with a user profile and sends the physical letter in the mail to an address associated with the user profile. In one embodiment, the platform is operable to transcribe the contents of a physical letter into a digital form of text to use as metadata and/or historical data. In one embodiment, the platform includes a system where an individual is assigned to a user profile and sends physical letters that includes responses, and prompts to an address associated with the user profile. In one embodiment, a user associated with a user profile receives a physical letter, sent to an address associated with a user profile, with a QR code that is scanned by a display device to display media content of the platform, add a user profile to a family network, add a user profile to a beneficiary system, and/or provide a prompt or message to display a GUI of an account creation menu of the platform.

Rememery Cardinal

In one embodiment, the present invention includes a Rememery Cardinal. In one embodiment, the Rememery Cardinal includes a physical object with a Quick Response (QR) code printed onto it and, upon scanning, is operable to access an augmented reality rendition of media posted onto the platform of the present invention.

In one embodiment, the present invention includes a physical object that works in tandem with the application of the present invention. In one embodiment, the physical object is in the shape of a cardinal bird. In the preferred embodiment, the physical object is of a shape, color, and look of a miniaturized male northern cardinal. In one embodiment, the physical object is of a size to comfortably rest in a user's hand. In one embodiment, the physical object or "Rememery Cardinal" includes a speaker, transceiver, and QR code printed on the outside of the object. However, one of ordinary skill in the art will appreciate that a physical object of any exterior design, shape, color, or texture is applicable to the present invention.

In one embodiment, the Rememery Cardinal is operable to functionally communicate with a display device running the application of the present invention, through the transceiver. In one embodiment, upon receipt of a notification, the Rememery Cardinal is operable to emit a sound through the speaker. In one embodiment, the Rememery Cardinal is operable to emit a notification sound anytime a display device running the application of the present invention receive a notification. In one embodiment, the Rememery Cardinal is operable to emit a notification sound anytime a user profile receives a notification. In one embodiment, the sound notification imitates the call of a male northern cardinal.

In one embodiment, the Rememery Cardinal includes a QR code that is operable to include encrypted information that is scannable and decryptable by a display device running the application of the present invention. In one embodiment, a display device running the application of the present invention is operable to scan and decrypt the QR code. In one embodiment, the QR code is operable, upon scanning, to access an Augmented Reality (AR) feature of the present invention. In one embodiment, the QR code is associated with a user profile. In one embodiment, a display device, upon scanning the QR code, is operable to transition to a GUI of a user profile.

In one embodiment, the application of the present invention is operable to functionally communicate with components of a display device running the application. In one embodiment, the application of the present invention is operable to functionally communicate with a camera, accelerometer, gyroscope, light sensor, and/or GPS of a display device running the application of the present invention. In one embodiment, the application of the present invention is operable to provide an augmented reality (AR) visual of media content posted onto the platform. In one embodiment, the application of the present invention is operable to utilize marker-based AR and/or projection-based AR. In one embodiment, the application of the present invention is operable to utilize the systems, methods, and apparatuses of U.S. Pat. Nos. 11,080,885, 11,270,516, 11,354,815, 8,791,960, 11,140,380, and 10,657,728, which are incorporated herein by reference in their entirety. In one embodiment, the application of the present invention is operable to display an AR environment through a camera of a display device running the application and/or through the wearable device disclosed in U.S. Pat. No. 9,933,623, which is incorporated herein by reference in its entirety.

In one embodiment, using the AR methods incorporated above, the application of the present invention is operable to display the media content of a storytelling post, narrative of life post, time capsule, any audio-based media, and/or any video-based media posted onto the platform (hereafter, "digital media") in an AR environment. In one embodiment, the application of the present invention is operable to overlay digital media onto a physical environment upon scanning the QR code of the Rememery Cardinal. In the preferred embodiment, the AR feature disclosed in the present application is initiated by scanning the QR code of the Rememery Cardinal. In one embodiment, the application of the present invention is operable, upon scanning the QR code of the Rememery Cardinal, to transition the GUI of the display device to an interface displaying digital media of the platform to be displayed in an AR environment. In one embodiment, the application is operable to display digital media on to a physical space viewed through a camera of a display device running the application. In one embodiment, the digital media is displayed on a flat surface of the physical space. In one embodiment, the digital media is displayed as a three-dimensional (3D) projection in the physical space. In one embodiment, the Rememery Cardinal is the maker used for a marker-based AR display of the digital media. In one embodiment, the digital media is displayed above the Rememery Cardinal in an AR environment. In one embodiment, information pertinent to the digital media is displayed on the Rememery Cardinal while the digital media itself is displayed above the Rememery Cardinal in an AR environment. In one embodiment, the date and time that the digital media relates to is displayed on the Rememery Cardinal in an AR environment. In one embodiment, the application of the present invention is operable to display an AR environment without scanning the QR code of the Rememery Cardinal. In one embodiment, the application of the present invention is operable to display the AR environment through the GUI of a display device running the application and/or through wearable devices disclosed in U.S. Pat. No. 9,933,623.

In one embodiment, the application of the present invention is operable to display an avatar in an AR environment upon scanning the QR code of the Rememery Cardinal. In one embodiment, the application is operable to display an avatar as a visual projection emitting from the Rememery Cardinal in an AR environment viewed through an interface of a display device running the application. In one embodiment, the avatar is of a visual appearance akin to the mythical entity, Father Time. In one embodiment, the AR environment is operable to display an avatar while playing the audio of a storytelling post or other audio media posted to the platform. In this embodiment, the AR environment is operable to display the avatar reciting the audio of the storytelling post. In one embodiment, the application of the present invention is operable, while displaying digital media in an AR environment, to play audio through the speaker of the Rememery Cardinal and/or through a speaker of a display device running the application. In one embodiment, the application of the present invention is operable to pose storytelling prompts through the avatar of the AR environment and receive voluntary responses from a user associated with a user profile through the microphone of the display device running the application. In one embodiment, the application of the present invention is operable to receive audio responses from a user associated with a user profile concerning a storytelling prompt posed by the avatar in an AR environment, transcribe the contents of the audio response into a text file using the methods described above, and utilize the text file as metadata and/or historical data for the Family-Friendly AI. In one embodiment, the avatar of the AR environment is operable to work in tandem with the Family-Friendly AI. In one embodiment, the avatar of the AR environment represents the Family-Friendly AI.

In one embodiment, the application of the present invention is operable to time-lock digital media prior to being accessible through the AR environment. In one embodiment, the application is operable to prevent digital media from being accessible until a predetermined time, upon which the digital media becomes accessible through the AR environment. In one embodiment, the application of the present invention is operable to display media content of a time capsule post in the AR environment and include the time-locked nature of a time capsule post. In one embodiment, the application is operable to display the amount of time remaining before media of a time capsule post is accessible through the AR environment. In the preferred embodiment, the application is operable to display a count-down clock of the time remaining to access the media associated with a time capsule post on the Rememery Cardinal in an AR environment.

Rememery Video Conferencing

In one embodiment, the present invention includes a video chat feature or video conferencing feature. In one embodiment, the application of the present invention is operable to functionally communicate with the camera, microphone, and speaker of a display device. In one embodiment, the application of the present invention is operable to connect users of the platform to one another such that they are able to hear, see, and converse with each other. In one embodiment, the application is operable to connect a plurality of users.

In one embodiment, the application of the present invention is operable to functionally communicate with the front facing camera, speaker, and microphone of a display device running the application. In the preferred embodiment, the application is operable to functionally communicate with the front facing camera, speaker, and microphone of a mobile phone running the application. In one embodiment, the application is operable to connect display devices running the application associated with user profiles of the platform through radio waves and/or Wi-Fi connections. In one embodiment, the application is operable to allow users associated with use profiles to converse with one another through mobiles phones by methods commonly known in the art. In one embodiment, the application of the present invention is operable to connect users associated with user profiles of the platform through a video conference or video chat by functionally communicating with a front facing camera of a display device running the application. In one embodiment, the application of the present invention is operable to record the conversations between users associated with user profiles of the platform, during a video conference or video chat. In one embodiment, the application of the present invention is operable to record and store the audio and video of a video conference. In one embodiment, the audio and video of a recorded video conference are stored separately. In one embodiment, the application is operable to post the audio and/or video of a recorded video conference as a storytelling post. In one embodiment, the application is operable to cut, splice, and/or edit manually or automatically the recorded video conference using one or more of the methods for editing a storytelling post disclosed in the present application. In the preferred embodiment, the application is operable to create a storytelling post from audio of a single individual of a recorded video conference. In the preferred embodiment, the video conference feature is used to aid an elderly individual in creating a storytelling post by allowing another user of the platform to converse with the elderly individual and encourage them to share a story about their life. In this embodiment, the video conference feature is operable to record the recounted story and transform it into a storytelling post. In one embodiment, the video conference feature is operable to transcribe the content of recorded audio into a text file to be used as historical and/or metadata for the Family-Friendly AI using methods described in the present application. In one embodiment, the media derived from a video conference is utilized in a storytelling post, narrative of life post, time capsule post, and/or any social post of the platform.

In one embodiment, the application of the present invention includes tutorial videos. In one embodiment, the application of the present invention is operable to display tutorial videos onto the GUI of a display device running the application. In one embodiment, the tutorial videos include media content to aid in the understanding of the features of the platform. In one embodiment, the tutorial videos teach users associated with user profiles how to use and navigate the features of the platform.

Figure 14:
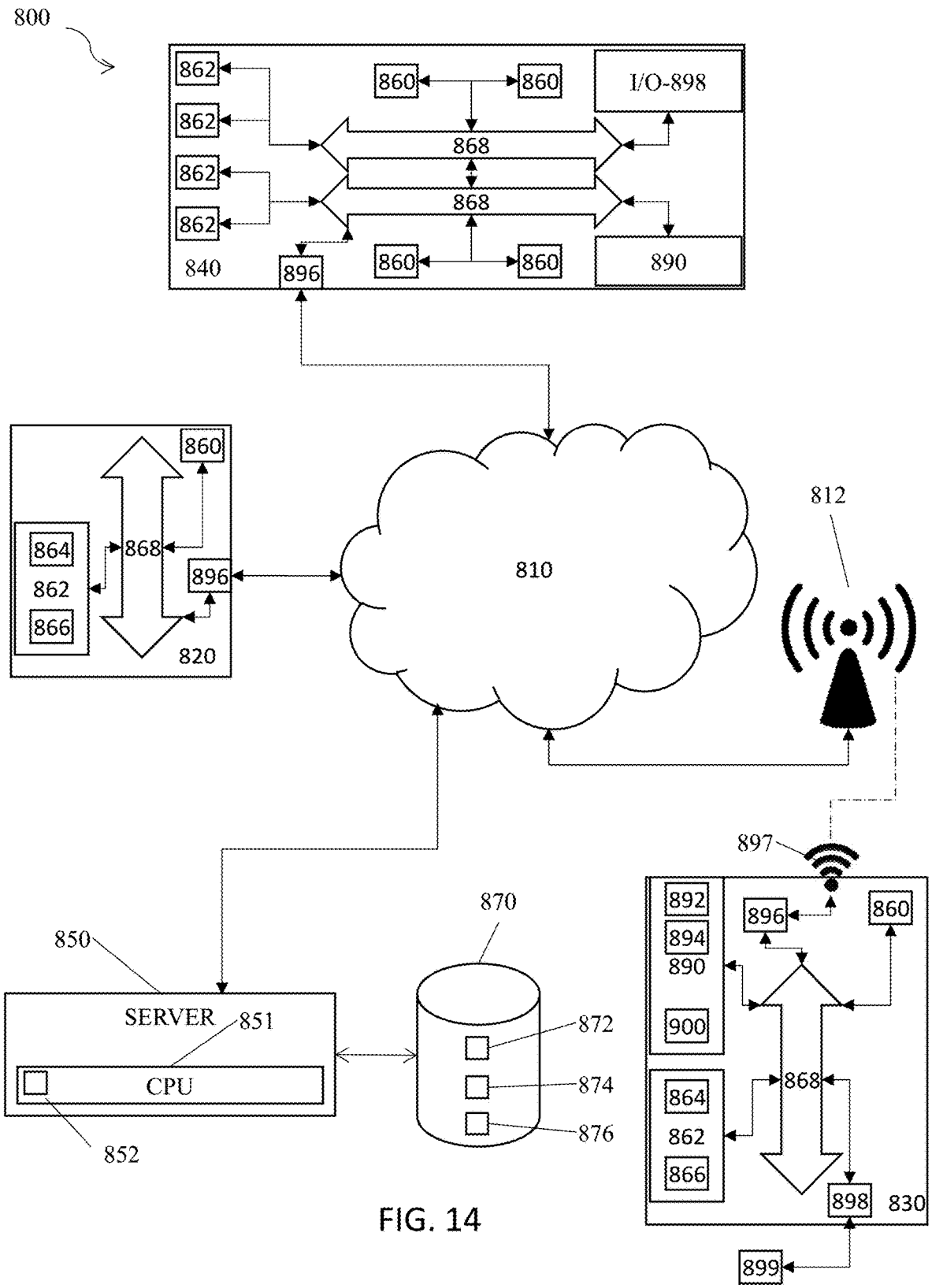
FIG. 14. is a schematic diagram of a system of the present invention.

FIG. 14 is a schematic diagram of a system of the present invention. FIG. 14 is a schematic diagram of an embodiment of the invention illustrating a computer system, generally described as 800, having a network 810, a plurality of computing devices 820, 830, 840, a server 850 and a database 870.

The server 850 is constructed, configured and coupled to enable communication over a network 810 with a computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a cloud-based network 810 for distributed communication via a wireless communication antenna 812 and processing by a plurality of mobile communication computing devices 830. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 14, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 14, may include other components that are not explicitly shown in FIG. 14, or may utilize an architecture completely different than that shown in FIG. 14. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A digital media compiling and sharing system comprising:
   a platform including a processor and a memory in network communication with at least one electronic device;
   wherein the platform is operable to receive a plurality of media content associated with a prompt;
   wherein the prompt includes at least one question to stimulate a telling of a story and/or a recollection of a memory;
   wherein the platform is operable to stitch and/or splice the plurality of media content in a chronological order;
   wherein the platform is operable to create categories and to categorize the ordered media in multiple time periods based on at least one answer to the prompt;
   wherein the platform is operable to publish the ordered media on a social media feed
   wherein the platform is operable to transfer the ordered media from a first user profile to a second user profile upon a trigger event, wherein the trigger event includes an incapacitation and/or death of an individual associated with the first user profile, and wherein the transfer includes a change in administrative privileges of the ordered media from the first user profile to the second user profile; and
   wherein the platform is operable to verify an authority of the second user profile to inherit the ordered media by determination of a relationship status between the first user profile and the second user profile through a death certificate, power of attorney, will and testament, birth certificate, marriage license, and/or guardianship appointment papers.

2. The system of claim 1, wherein the platform is operable to publish the ordered media on the social media feed at a predetermined time, and wherein the ordered media is not accessible until the predetermined time.

3. The system of claim 1, wherein the platform is operable to overlay the ordered media with text and/or combine the ordered media with additional audio, such that audio of the ordered media is simultaneously played with the additional audio.

4. The system of claim 1, wherein the platform is operable to receive a scan of a physical photo from a camera of the at least one electronic device or a digital photo scanner and include the scanned physical photo in the ordered media.

5. The system of claim 1, wherein the plurality of media content includes a video, audio, and/or text file created following capture of video and/or audio by a camera of the at least one electronic device and/or following text input to the at least one electronic device.

6. The system of claim 1, wherein the platform is operable to display the ordered media through a time slider interface, wherein the ordered media is displayed in a pop-up window above the time slider interface, wherein the time slider interface includes a draggable time bar on an elongated temporal bar representing the chronology of the ordered media, wherein a portion of ordered media is displayed in the pop-up window is associated with the position of the draggable time bar on the elongated temporal bar, and wherein the draggable time bar is operable to change the plurality of media content displayed based on the position on the elongated temporal bar.

7. A digital media compiling and sharing system comprising:
   a platform including a processor and a memory in network communication with at least one electronic device;
   wherein the platform is operable to receive a plurality of media content associated with a prompt;
   wherein the prompt includes at least one question to stimulate a telling of a story and/or a recollection of a memory;
   wherein the platform is operable to store the plurality of media content for a specified time period;

wherein the platform is operable to associate the stored plurality of media content with a user profile;

wherein the platform is operable to associate the stored plurality of media content with location data specifying a location and wherein the plurality of media content is inaccessible until the at least one electronic device is within a predetermined proximity of the specified location or is at the specified location;

wherein the stored plurality of media content is inaccessible until passage of the specified time period;

wherein the stored plurality of media content is sent to the user profile upon the passage of the specified time period;

wherein the platform is operable to transfer the plurality of media content from a first user profile to a second user profile upon a trigger event, wherein the trigger event includes an incapacitation and/or death of an individual associated with the first user profile, and wherein the transfer includes a change in administrative privileges of the plurality of media content from the first user profile to the second user profile; and wherein the platform is operable to verify an authority of the second user profile to inherit the plurality of medica content by determination of a relationship status between the first user profile and the second user profile through a death certificate, power of attorney, will and testament, birth certificate, marriage license, and/or guardianship appointment papers.

8. The system of claim 7, wherein the plurality of media content includes at least one video, audio, and/or text file created following capture of video and/or audio by a camera of the at least one electronic device and/or following text input to the at least one electronic device.

9. The system of claim 7, wherein the platform includes a location overlay interface operable to display a preview of the stored plurality of media content on a map associated with the location data.

10. The system of claim 7, wherein the platform is operable to send a notification to the at least one electronic device upon the stored plurality of media content becoming accessible, and wherein upon selection of the notification provides for display of the stored plurality of media content on the at least one electronic device.

11. A method for digitally compiling and sharing media comprising:

a platform including a processor and a memory receiving a plurality of media content associated with a life story from at least one electronic device;

the platform chronologically ordering the plurality of media content to represent a narrative of the life story;

the platform automatically creating a multimedia presentation from the chronologically ordered plurality of media content by categorically compiling storytelling posts based on similarities between the storytelling posts, wherein the multimedia presentation consists of a single multimedia file;

the platform publishing the multimedia presentation on a social media feed;

the platform transferring the multimedia presentation from a first user profile to a second user profile upon a trigger event, wherein the trigger event includes an incapacitation and/or death of an individual associated with the first user profile, and the platform transferring the multimedia presentation includes a change in administrative privileges of the multimedia presentation from the first user profile to the second user profile; and the platform verifying an authority of the second user profile to inherit the multimedia presentation by determination of a relationship status between the first user profile and the second user profile through a death certificate, power of attorney, will and testament, birth certificate, marriage license, and/or guardianship appointment papers.

12. The method of claim 11, wherein the plurality of media content is a video, audio, and/or text file created following capture of video and/or audio by a camera of the at least one electronic device and/or following text input to the at least one electronic device.

13. The method of claim 11, wherein the plurality of media content associated with a life story is received by the platform following selection from a selectable list of previously created media content.

14. The method of claim 11, wherein the multimedia presentation is published upon a death of a user associated with a user profile of the multimedia presentation.

* * * * *